(12) United States Patent
Holness

(10) Patent No.: US 11,310,102 B2
(45) Date of Patent: Apr. 19, 2022

(54) RETAINING ACTIVE OPERATIONS, ADMINISTRATION, AND MAINTENANCE (OAM) SESSIONS ACROSS MULTIPLE DEVICES OPERATING AS A SINGLE LOGICAL DEVICE

(71) Applicant: Ciena Corporation, Hanover, MD (US)

(72) Inventor: Marc Holness, Nepean (CA)

(73) Assignee: Ciena Corporation, Hanover, MD (US)

(*) Notice: Subject to any disclaimer, the term of this patent is extended or adjusted under 35 U.S.C. 154(b) by 0 days.

(21) Appl. No.: 16/530,079

(22) Filed: Aug. 2, 2019

(65) Prior Publication Data
US 2021/0036910 A1   Feb. 4, 2021

(51) Int. Cl.
| | | |
|---|---|---|
| H04L 12/24 | (2006.01) | |
| H04L 12/26 | (2006.01) | |
| H04L 41/0668 | (2022.01) | |
| H04L 41/0816 | (2022.01) | |
| H04L 43/0829 | (2022.01) | |
| H04L 43/10 | (2022.01) | |

(52) U.S. Cl.
CPC ...... *H04L 41/0668* (2013.01); *H04L 41/0816* (2013.01); *H04L 43/0829* (2013.01); *H04L 43/10* (2013.01)

(58) Field of Classification Search
CPC . H04L 41/0668; H04L 43/10; H04L 41/0816; H04L 43/0829
See application file for complete search history.

(56) References Cited

U.S. PATENT DOCUMENTS

| 7,590,054 B1 | 9/2009 | Holness et al. |
| 7,792,044 B2 | 9/2010 | Holness et al. |
| 7,924,725 B2 | 4/2011 | Mohan et al. |

(Continued)

FOREIGN PATENT DOCUMENTS

| CN | 109 462 557 A | 3/2019 |
| EP | 2 690 823 A1 | 1/2014 |
| EP | 2 961 101 A1 | 12/2015 |

OTHER PUBLICATIONS

MEF, The Metro Ethernet Forum, Technical Specification MEF 30, Service OAM Fault Management Implementation Agreement, Jan. 2011, pp. 1-40.

(Continued)

*Primary Examiner* — Jung H Park
(74) *Attorney, Agent, or Firm* — Clements Bernard Baratta; Lawrence A. Baratta, Jr.; Christopher L. Bernard

(57) ABSTRACT

A logical Network Interface Device (NID) includes a first NID connected to a peer NID; a second NID connected to the peer NID and communicatively coupled to the first NID, wherein the first NID and the second NID are each connected to a network element for redundant communication to the peer NID, and wherein the first NID actively operates an active maintenance endpoint in an Operations, Administration, and Maintenance (OAM) session with the peer NID, and wherein the active maintenance endpoint synchronizes OAM session data with a dormant maintenance endpoint at the second NID. The dormant maintenance endpoint becomes the active maintenance endpoint responsive to a protection switch, and the dormant maintenance endpoint has the OAM session data in a database based on synchronization with the first NID.

17 Claims, 22 Drawing Sheets

(56) References Cited

U.S. PATENT DOCUMENTS

| | | |
|---|---|---|
| 8,149,692 B2 | 4/2012 | Holness et al. |
| 8,509,061 B2 | 8/2013 | Holness et al. |
| 8,625,410 B2 | 1/2014 | Abdullah et al. |
| 8,737,198 B1 | 5/2014 | Holness et al. |
| 8,787,147 B2 | 7/2014 | Caird et al. |
| 8,787,398 B2 | 7/2014 | Holness et al. |
| 9,075,717 B2 | 7/2015 | Mohan, Jr. et al. |
| 9,264,254 B2 | 2/2016 | Holness et al. |
| 9,264,328 B2 | 2/2016 | Hu et al. |
| 9,893,937 B2 | 2/2018 | Holness et al. |
| 9,960,993 B2 | 5/2018 | Hu et al. |
| 10,193,765 B2 | 1/2019 | Holness et al. |
| 2005/0099949 A1 | 5/2005 | Mohan et al. |
| 2005/0099951 A1 | 5/2005 | Mohan et al. |
| 2005/0099954 A1 | 5/2005 | Mohan et al. |
| 2005/0099955 A1 | 5/2005 | Mohan et al. |
| 2007/0064700 A1 | 3/2007 | Holness |
| 2007/0133502 A1* | 6/2007 | Osswald ............... H04L 41/06 370/351 |
| 2010/0315946 A1* | 12/2010 | Salam .................. H04L 45/68 370/222 |
| 2012/0170477 A1* | 7/2012 | Hieda ................ H04L 12/4625 370/252 |
| 2013/0232258 A1* | 9/2013 | Bullock .............. H04L 43/0811 709/224 |
| 2013/0329565 A1 | 12/2013 | Holness et al. |
| 2014/0226972 A1* | 8/2014 | Missett ............... H04L 43/0811 398/25 |
| 2014/0369186 A1 | 12/2014 | Ernstrom et al. |
| 2015/0049601 A1* | 2/2015 | Bugenhagen ....... H04L 41/0686 370/228 |
| 2016/0048403 A1* | 2/2016 | Bugenhagen ........... H04L 43/08 718/1 |
| 2018/0294969 A1 | 10/2018 | Holness |
| 2018/0295031 A1 | 10/2018 | Holness |
| 2018/0351855 A1 | 12/2018 | Sood et al. |

OTHER PUBLICATIONS

MEF, The Metro Ethernet Forum, Implementation Agreement MEF 35, Service OAM Performance Monitoring Implementation Agreement, Apr. 2012, pp. 1-89.

Frost et al., Packet Loss and Delay Measurement for MPLS Networks, Internet Engineering Task Force (IETF), Category: Standards Track, ISSN: 2070-1721, Sep. 2011, pp. 1-52.

International Telecommunication Union, ITU-T G.8013/Y.1731, Telecommunication Standardization Sector of ITU, Operation, administration and maintenance (OAM) functions and mechanisms for Ethernet-based networks, Aug. 2015, pp. 1-102.

Finn, IEEE 802 Connectivity Fault Management / ITU-T Ethernet OAM Overview, IETF91 Honolulu, pp. 1-17.

Oct. 21, 2020, International Search Report and Written Opinion for International Application No. PCT/US2020/041874.

* cited by examiner

RETAINING ACTIVE OPERATIONS, ADMINISTRATION, AND MAINTENANCE (OAM) SESSIONS ACROSS MULTIPLE DEVICES OPERATING AS A SINGLE LOGICAL DEVICE

FIELD OF THE DISCLOSURE

The present disclosure generally relates to networking. More particularly, the present disclosure relates to systems and methods for retaining active Operations, Administration, and Maintenance (OAM) sessions across multiple devices operating as a single logical device.

BACKGROUND OF THE DISCLOSURE

In packet networks, OAM sessions are performed via periodic frame or Protocol Data Unit (PDU) transmission. Examples of packet layer OAM include IEEE 802.1ag Connectivity Fault Management (CFM), ITU Recommendation G.8013/Y.1731 "Operations, administration and maintenance (OAM) functions and mechanisms for Ethernet-based networks," (Aug. 2015), IETF RFC 6374 "Packet Loss and Delay Measurement for MPLS Networks" (Sep. 2011), MEF 30 "Service OAM Fault Management Implementation Agreement" (Jan. 2011), and MEF 35 "Service OAM Performance Monitoring Implementation Agreement" (Apr. 2012), the contents of each is incorporated by reference herein. Specific examples of OAM PDUs/frames include Continuity Check Messages (CCMs), Delay Measurements (e.g., Delay Measurement Message (DMM) and Delay Measurement Reply (DMR), Loss Measurements (e.g., Loss Measurement Message (LMM) and Loss Measurement Reply (LMR)), and the like.

In operation, an OAM session is between two network devices, e.g., Network Interface Devices (NIDs). There is a deployment where multiple network devices, NIDs, are deployed in a redundant manner where two physical (or virtual) NIDs are used to form a single logical NID. Of note, the two physical (or virtual) NIDs are separate devices from an OAM perspective but are connected to the same far end node. There is no conventional technique to configure a pair of OAM maintenance points to be identical, i.e., there is no concept of an "active" and "inactive/dormant" maintenance point.

BRIEF SUMMARY OF THE DISCLOSURE

In an embodiment, a logical Network Interface Device (NID) includes a first NID connected to a peer NID; and a second NID connected to the peer NID and communicatively coupled to the first NID, wherein the first NID and the second NID are each connected to a network element for redundant communication to the peer NID, wherein the first NID actively operates an active maintenance endpoint in an Operations, Administration, and Maintenance (OAM) session with the peer NID, and wherein the active maintenance endpoint synchronizes OAM session data with a dormant maintenance endpoint at the second NID. The dormant maintenance endpoint can become the active maintenance endpoint responsive to a protection switch, and wherein the dormant maintenance endpoint has the OAM session data in a database based on synchronization with the first NID. The active maintenance endpoint can synchronize with the dormant maintenance endpoint by providing copies of OAM Protocol Data Units (PDUs). The active maintenance endpoint can synchronize with the dormant maintenance endpoint by providing relevant information from OAM Protocol Data Units (PDUs). The active maintenance endpoint can perform one or more of a generator function, a collector function, and a reflector function, each configured to provide data to the dormant maintenance endpoint. The active maintenance endpoint and the dormant maintenance endpoint can have the same configuration and the OAM session data such that peer NID is configured to operate the OAM session with either one based on protection. The OAM session data can relate to any of continuity checks, loopbacks, linktrace, delay measurements, and packet loss measurements.

In another embodiment, a Network Interface Device (NID) includes a first port connected to a peer NID over a network; a second port connected to a network element; a communications interface connected to a second NID, wherein the second NID is also connected to the peer NID and the network element to provide redundancy; and circuitry configured to operate an active maintenance endpoint in an Operations, Administration, and Maintenance (OAM) session with the peer NID, and synchronize OAM session information with a dormant maintenance endpoint at the second NID, via the communications interface. The circuitry can be further configured to switch the active maintenance endpoint to the dormant maintenance endpoint responsive to a protection switch, and synchronize the OAM session information from the active maintenance endpoint now at the second NID. The active maintenance endpoint can synchronize with the dormant maintenance endpoint by providing copies of OAM Protocol Data Units (PDUs). The active maintenance endpoint can synchronize with the dormant maintenance endpoint by providing relevant information from OAM Protocol Data Units (PDUs). The active maintenance endpoint can perform one or more of a generator function, a collector function, and a reflector function, each configured to provide data to the dormant maintenance endpoint. The active maintenance endpoint and the dormant maintenance endpoint can have the same configuration and the OAM session information such that peer NID is configured to operate the OAM session with either one based on protection. The OAM session data can relate to any of continuity checks, loopbacks, linktrace, delay measurements, and packet loss measurements.

In a further embodiment, a method includes, in a first Network Interface Device (NID), operating an active maintenance endpoint in an Operations, Administration, and Maintenance (OAM) session with a peer device in a network; and synchronizing OAM session information with a dormant maintenance endpoint at a second NID, wherein the first NID and the second NID are each connected to a network element for redundant communication to the peer NID. The method can further include switching the active maintenance endpoint to the dormant maintenance endpoint responsive to a protection switch; and synchronizing the OAM session information from the active maintenance endpoint now at the second NID. The active maintenance endpoint can synchronize with the dormant maintenance endpoint by providing copies of OAM Protocol Data Units (PDUs). The active maintenance endpoint can synchronize with the dormant maintenance endpoint by providing relevant information from OAM Protocol Data Units (PDUs). The active maintenance endpoint can perform one or more of a generator function, a collector function, and a reflector function, each configured to provide data to the dormant maintenance endpoint. The active maintenance endpoint and the dormant maintenance endpoint can have the same configuration and the OAM session information such that peer NID is configured to operate the OAM session with either one based on protection.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1A:
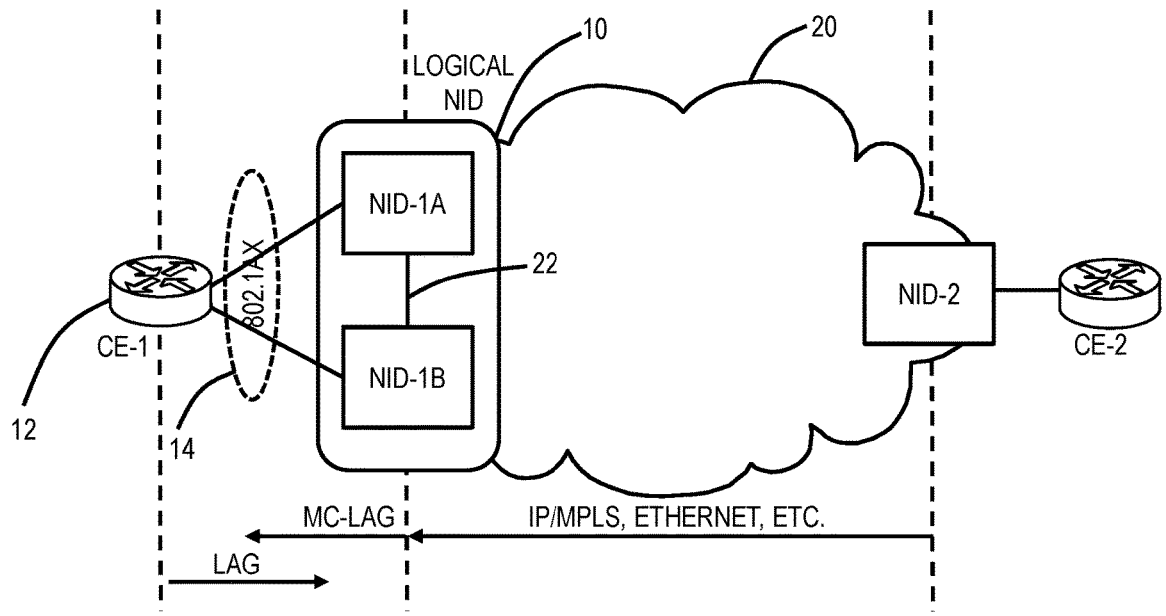
FIGS. 1A and 1B are network diagrams of a logical Network Interface Device (NID) with FIG. 1A illustrating the logical NID connected to a router via a Link Aggregation Group (LAG) and FIG. 1B illustrating the logical NID connected to the router via a passive optical splitter.

The present disclosure relates to systems and methods for retaining active Operations, Administration, and Maintenance (OAM) sessions across multiple devices operating a single logical device. Specifically, the present disclosure allows a logical NID that is composed of multiple physical or virtual NIDs to present a single OAM session to a peer device. Accordingly, active OAM sessions are retained in the event of a switchover between devices within the logical NID. As described herein, a NID is a device whether physical or virtual (e.g., a Virtual Network Function (VNF) executed on a processing device) that acts as a service demarcation point between a customer premise and a network. The present disclosure allows a switchover between devices in a logical NID while maintaining active OAM sessions. The logical NID may also be referred to as a virtual NID.

Specifically, the present disclosure includes an "inactive/dormant" OAM maintenance endpoint that mirrors the configuration of an "active" OAM maintenance endpoint but does not generate nor actively participate in an OAM session. For illustration purposes, the "inactive/dormant" OAM maintenance endpoint is referred to herein as a "dormant" OAM maintenance endpoint. A dormant OAM maintenance endpoint does maintain OAM database information, however, which can be updated based upon either OAM Protocol Data Units (PDUs) received or OAM information received, from the active OAM maintenance endpoint. A dormant maintenance endpoint can become active when the interface it is associated with becomes active. When a previously dormant maintenance endpoint becomes active, it can now actively participate in in-progress OAM sessions and start new OAM sessions.

The active and dormant maintenance endpoints share an identical OAM configuration (e.g., Maintenance Endpoint (MEP) identifier, etc.). A remote peer MEP does not and cannot distinguish between a local active and inactive MEP. The present disclosure utilizes a generator/collector function at the logical NIDs and a reflector function at the peer NID to "reflect" OAM PDUs to the inactive maintenance endpoint. An active maintenance endpoint fulfilling a generator/collector function makes a copy of any received OAM PDUs and sends to the dormant maintenance endpoint. An active maintenance endpoint fulfilling a reflector function makes a copy of any transmitted OAM PDUs and sends to the dormant maintenance endpoint. A dormant maintenance endpoint can process received OAM PDUs, update OAM session database information for local storage, and compute measurements based upon information found within the OAM PDU.

An active maintenance endpoint fulfilling a generator/collector function can provide information to the dormant maintenance endpoint containing the time when the last continuity check (e.g., CCM, Bidirectional Forwarding Detection (BFD), etc.) PDU was received. An active maintenance endpoint fulfilling a generator/collector function can provide information to the dormant maintenance endpoint containing the transaction identifier (or sequence number), and the number of loopback PDUs (e.g., Loopback Message (LBM), Ping) transmitted during this session. An active maintenance endpoint fulfilling a generator/collector function can provide information to the dormant maintenance endpoint containing the transaction identifier (or sequence number) associated with the link trace reply PDU (e.g., Link Trace Response (LTR), MPLS trace, etc.).

An active maintenance endpoint fulfilling a generator/collector function can provide information to the dormant maintenance endpoint containing the {min, max, avg, current} packet loss associated with the synthetic frame loss protocol session (e.g., Synthetic Loss Message (SLM)/Synthetic Loss Response (SLR), MPLS inferred packet loss). An active maintenance endpoint fulfilling a reflector function can provide information to the dormant maintenance endpoint containing the free running Rx frame counter (RxFC) associated with the synthetic frame loss protocol session (e.g., SLM/SLR, MPLS inferred packet loss). An active maintenance endpoint fulfilling a generator/collector function can provide information to the dormant maintenance endpoint containing the {min, max, avg, current} packet delay and delay variation associated with the frame delay protocol session (e.g., Delay Measurement Message (DMM)/Delay Measurement Response (DMR), MPLS delay measurement).

Network

Figure 1B:
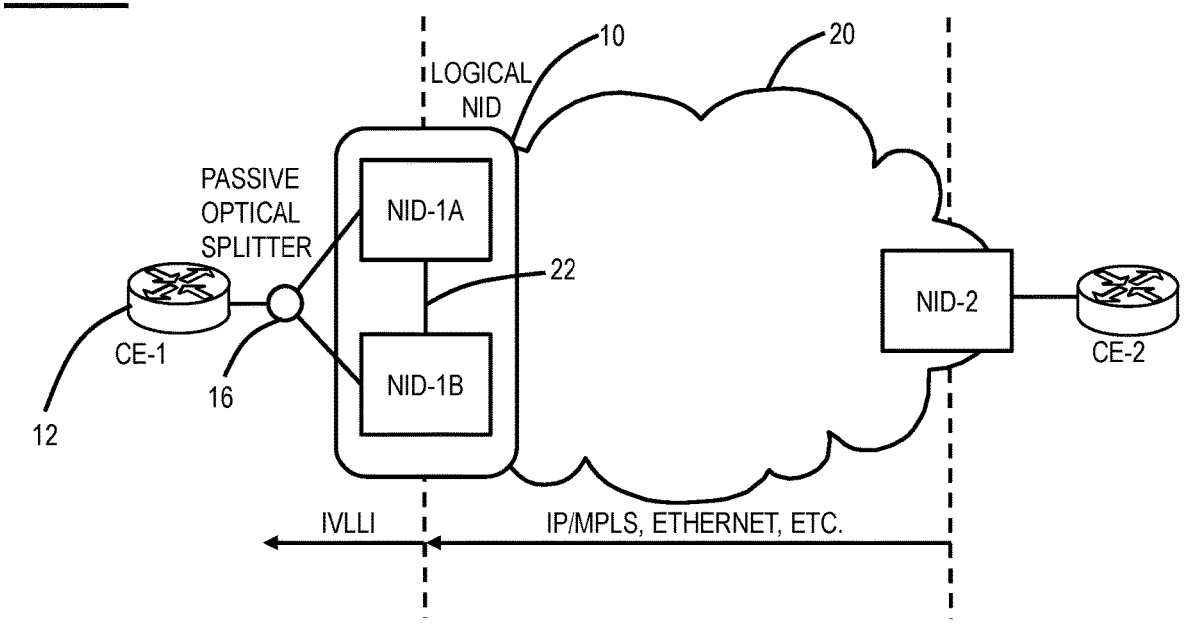

FIGS. 1A and 1B are network diagrams of a logical Network Interface Device (NID) 12 with FIG. 1A illustrating the logical NID connected to a router 12 via a Link Aggregation Group (LAG) 14 and FIG. 1B illustrating the logical NID connected to the router 12 via a passive optical splitter 16. The logical NID 10 includes two different devices, i.e., physical or virtual devices. For example, small, non-chassis based, devices (e.g., at network edge/access points) are being deployed in redundant fashion for the logical NID 10. This type of deployment provides economic and operational advantages to a network operator, since, as an example, two small edge devices are often less expensive in cost, size, power, etc. than a small, multi-blade chassis device. By deploying these small edge devices (e.g., switches, bridges, routers, labeled as NID-1A, NID-1B) in pairs, redundancy of both the data plane and even control plane can be achieved, via the logical NID 10. Further, these disparate devices NID-1A, NID-1B can be presented to a single device presence to its counterparts within a network 20, e.g., a NID-2. As described herein, the devices NID-1A, NID-1B are collectively the logical NID 10. Also, the network 20 can include IP/MPLS, Ethernet, etc.

There are different approaches to connect the router 12, which is a client/customer device to the logical NID 10. In FIG. 1A, the router 12 is connected via a LAG 14 which includes two legs from the router 12 with each leg connected to one of the devices NID-1A, NID-1B. The LAG 14 can be as defined in IEEE 802.1AX, the contents of which are incorporated by reference. One aspect of the LAG 14 is for redundancy. The LAG 14 can operate a Link Aggregation Control Protocol (LACP) which can determine which of the leg is active and which is standby. The logical NID 10 can operate as a Multi-Chassis LAG (MC-LAG) towards the router 12. In FIG. 1B, the router 12 can be connected to the devices NID-1A, NID-1B via the passive optical splitter 16. For example, the passive optical splitter 16 can be a Y-cable. The Y-cable includes hardware combiner/splitters. A signal injected into the stem of the Y is duplicated into both arms of the Y with 50 percent attenuation in each arm. Signals injected into the arms of the Y are summed into the stem of the Y.

The present disclosure focuses on strategies to support an OAM plane between the devices NID-1A, NID-1B in the logical NID 10. Note, there is a communication interface 22 connecting the devices NID-1A, NID-1B. The communication interface 22 can be a network connection between the devices NID-1A, NID-1B, a direct connection, a wireless connection, etc. Further, the communication interface 22 can be a port connected on each of the devices NID-1A, NID-1B to one another. Even further, the communication interface 22 can be via an intermediate device such as a management system. A primary challenge of the logical NID 10, with respect to OAM, is to present a single OAM session to the peer NID-2, even in the event of a switchover that may occur within the logical NID 10.

Logical NID

Figure 2:
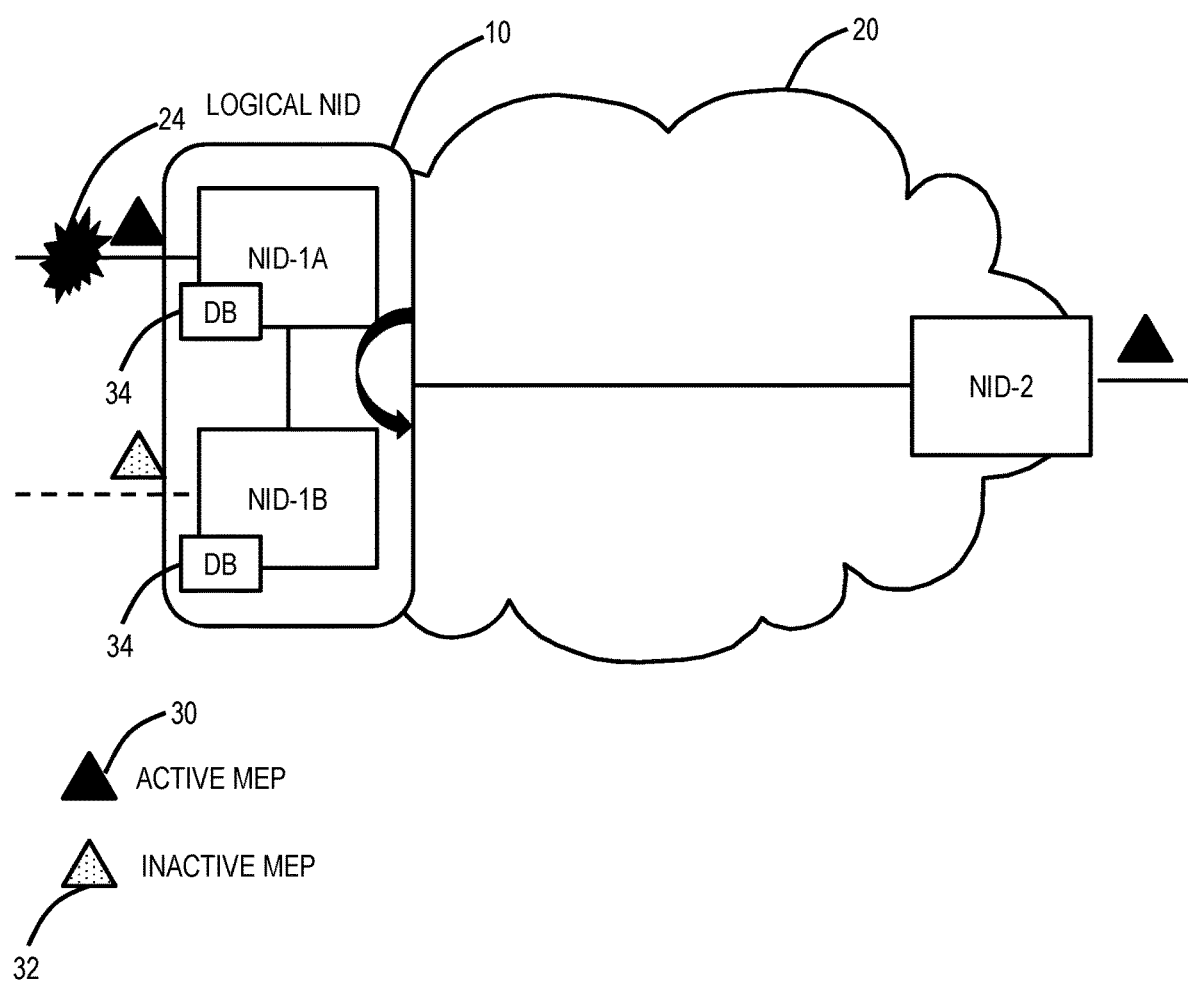
FIG. 2 is a network diagram of a switchover between the devices NID-1A, NID-1B in the logical NID due to a fault.

FIG. 2 is a network diagram of a switchover between the devices MD-1A, MD-1B in the logical NID 10 due to a fault 24. The fault 24 can include a failure of the link connecting the router 12 (e.g., a network element) to the device NID-1A, a fault on the device NID-1A, etc. Responsive to the fault 24, the device NID-1B is configured to provide redundancy, i.e., become active. The present disclosure ensures OAM protocol session between the device NID-1A and the device NID-2 continue to operate gracefully in the event of the fault 24 and the switchover to the device NID-1B.

The present disclosure includes active maintenance endpoints 30 and a dormant ("inactive") maintenance endpoint 32. The logical NID 10 includes one of the devices NID-1A, NID-1B operating an active maintenance endpoint 30 and the other device NID-1A, NID-1B operating a dormant maintenance endpoint 32. The device NID-2 operates an active maintenance endpoint 30.

During the processing of OAM PDUs from an active OAM session by the active maintenance endpoint (e.g., the device NID-1A), information may be dispatched to the dormant maintenance endpoint 32 (e.g., the device NID-1B). During this time, the dormant maintenance endpoint 32 (e.g., the device NID-1B) will update its internal session database 34 information, using the shared information from the active maintenance endpoint 30 (e.g., the device NID-1A). When a switchover occurs, (e.g., making the device NID-1B maintenance endpoint active), the internal session database 34 information should be (adequately) synchronized and would be used to gracefully commence the OAM session with the peer maintenance endpoint at the device NID-2.

There are two approaches for the devices MD-1A, NID-1B to share information over the communication interface 22, namely distributing OAM PDUs from the active maintenance endpoint 30 to the dormant maintenance endpoint 32 or distributing OAM session information from the active maintenance endpoint 30 to the dormant maintenance endpoint 32. Both of these approaches rely on the following assumptions. First, an active maintenance endpoint 30 and a dormant maintenance endpoint 32 share the same configuration (e.g., MEP identifier, Maintenance Entity Group (MEG) level, etc.). A dormant maintenance endpoint 32 does not actively participate in the OAM session. For example, it does not trigger any alarms nor traps, nor generate any OAM PDUs, etc. However, it may receive OAM PDUs or other OAM related data and process this information to update any OAM session database 34 information. Second, a session generator should be (simultaneously) invoked on both devices NID-1A, NID-1B (i.e., both active and dormant maintenance endpoints) within the logical NID 10.

Figure 3:
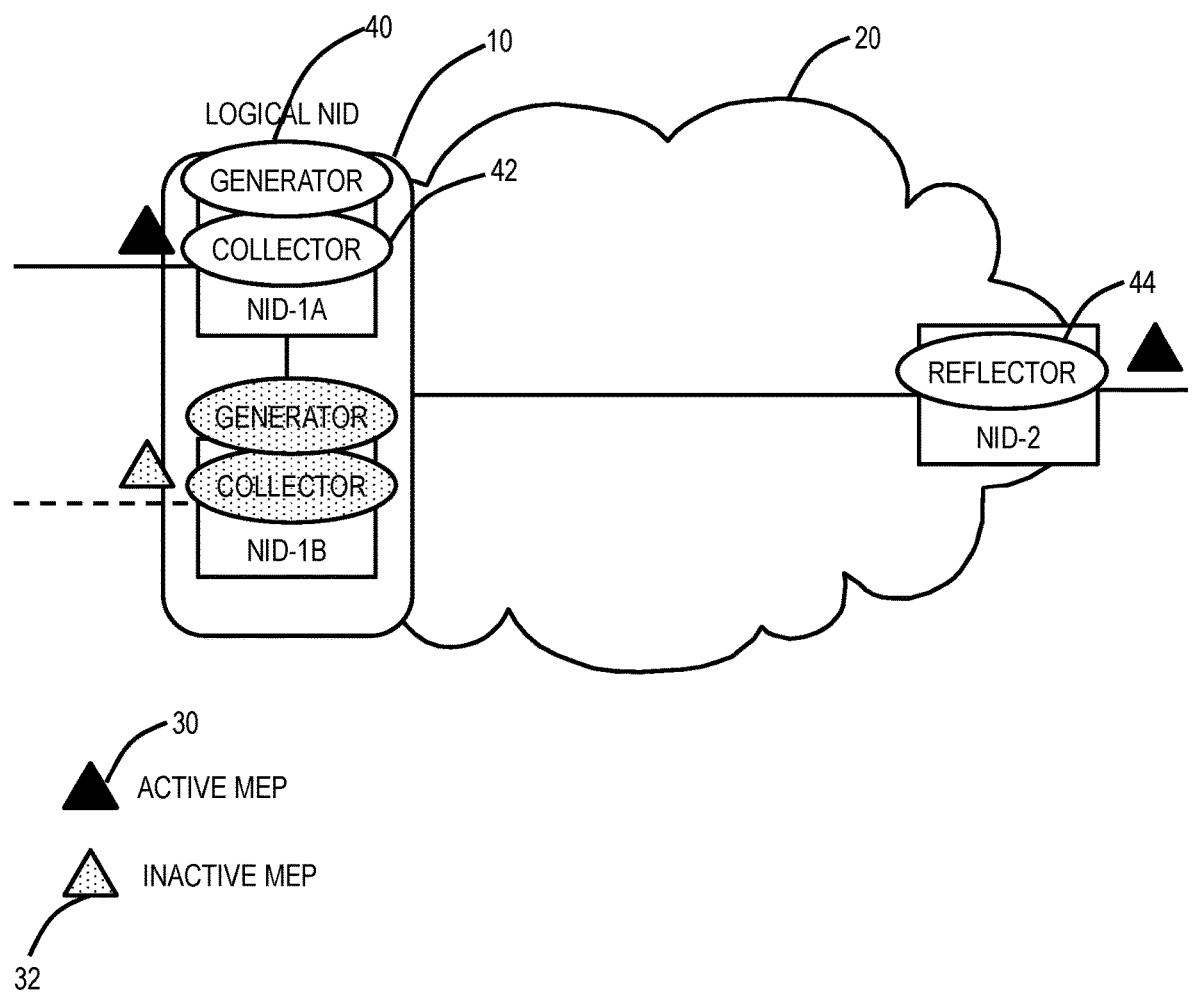
FIG. 3 is a network diagram of the logical NID and the peer NID-2 illustrating a generator function, a collector function, and a reflector function.

FIG. 3 is a network diagram of the logical NID 10 and the peer NID-2 illustrating a generator function 40, a collector function 42, and a reflector function 44. As described herein, the functions 40, 42, 44 are performed by an entity at the associated device NID-1A, NID-1B, NID-2 that can be software executed on processing hardware at the devices NID-1A, NID-1B, NID-2, functions implemented in circuitry at the devices NID-1A, NID-1B, NID-2, and combinations thereof. Again, service OAM sessions are typically run between service access points (i.e., NID). The generator function 40 is an entity that initiates the OAM protocol session by transmitting an OAM PDU. A collector function 42 is an entity that collects the readings and computes the measurements. A reflector function 44 is an entity that responds to an OAM PDU that was initiated by the generator function 40.

Approach #1—Distribution of OAM PDUs in the Logical NID

The first approach includes the active maintenance endpoint 30 in the logical NID 10 providing the OAM PDUs to the dormant maintenance endpoint 32, such as over the communication interface 22. If the logical NID 10 is performing the generator/collector functions at the active maintenance endpoint 30, then it will dispatch a copy of the received session OAM PDU to the dormant maintenance endpoint 32. If the logical NID 10 is performing the reflector function at the active maintenance endpoint 30, then it will dispatch a copy of the reflected session OAM PDU to the dormant maintenance endpoint 32.

In this manner, the dormant maintenance endpoint 32 has the associated database 34 up to date with the corresponding database 34 at the active maintenance endpoint 30. That is, by sharing these OAM PDUs with the dormant maintenance endpoint 32, the inactive device (within the logical NID 10) can maintain its own OAM session database 34 in a consistent manner with the OAM session database 34 at the active maintenance endpoint 30. Consequently, when a switchover occurs within the logical NID 10, the OAM session can be gracefully maintained uninterrupted and can be transparent to the peer maintenance endpoint at the device NID-2 participating in the OAM session.

FIGS. 4-12 are various network diagrams illustrating the first approach with example PDUs for continuity checks, loopbacks, link trace, synthetic loss, and delay measurement. Those of ordinary skill in the art will recognize other types of PDUs are also contemplated.

Figure 4A:
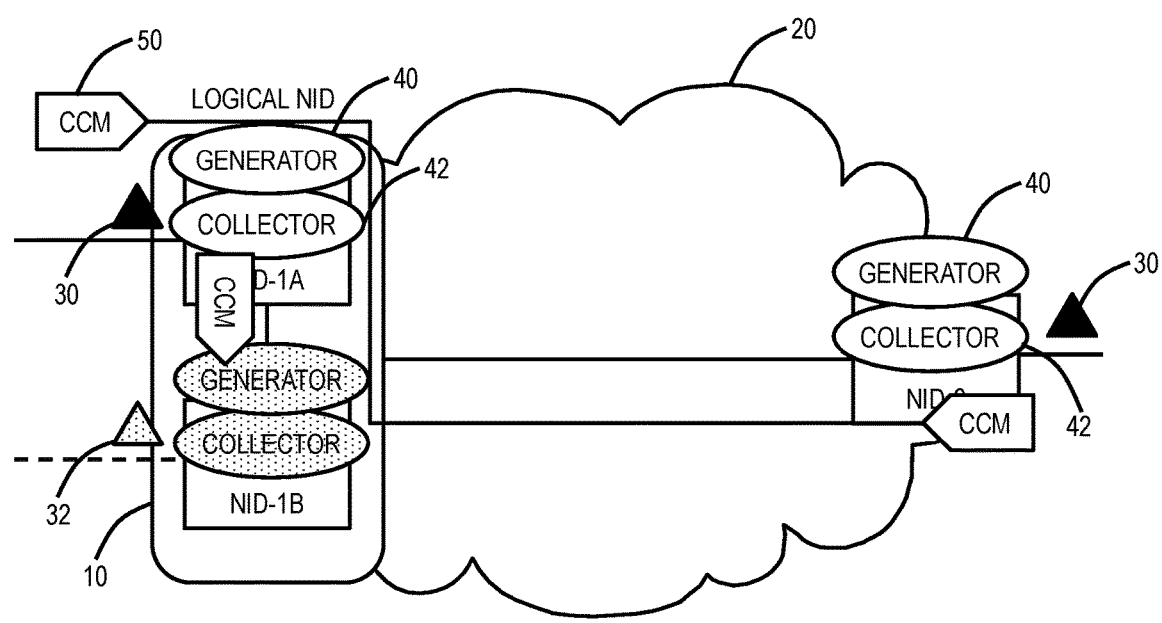
FIGS. 4A and 4B are network diagrams illustrating a continuity check Protocol Data Unit (PDU) that is shared between the devices NID-1A, NID-1B in the logical NID.
Figure 4B:
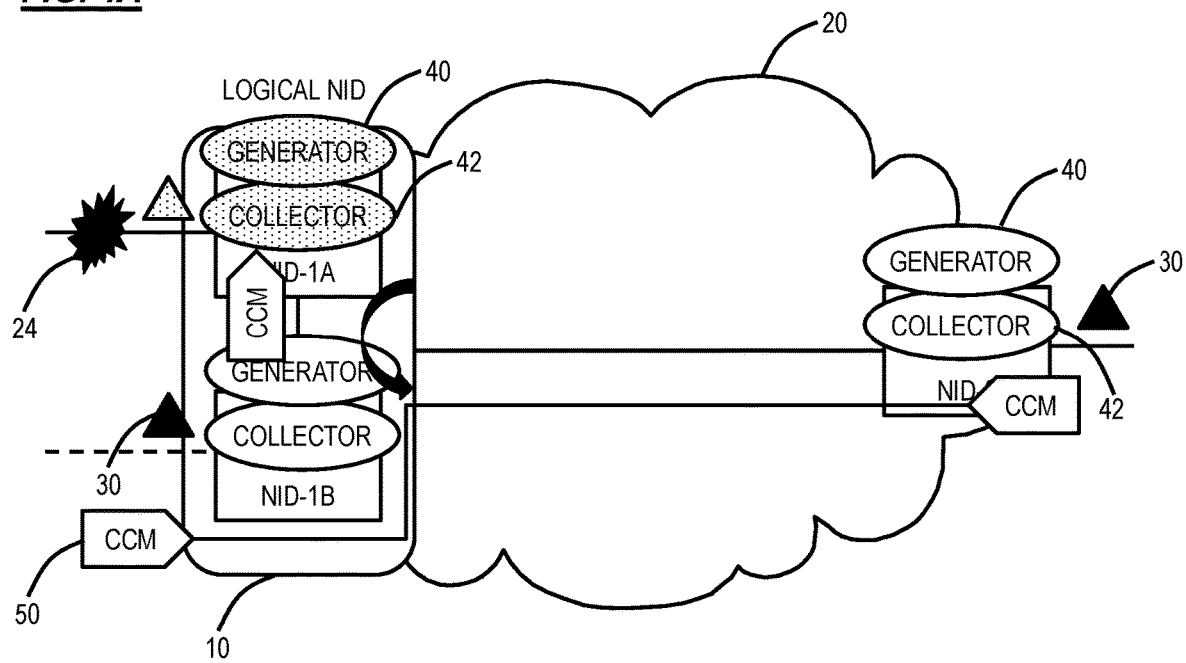

FIGS. 4A and 4B are network diagrams illustrating a continuity check PDU 50 that is shared between the devices NID-1A, NID-1B in the logical NID 10. A continuity check PDU 50 is used as a "heartbeat" message to determine link availability. For example, failure to receive a certain number of continuity check PDUs 50 can cause a link to be declared down. Example OAM protocol instances of continuity check PDUs 50 include IEEE 802.1Q-2018 Connectivity Fault Monitoring (CFM) Continuity Check Message (CCM) protocol and IETF RFC 884 Bidirectional Forwarding Detection (BFD) protocol, the contents of which are incorporated by reference herein.

In FIGS. 4A and 4B, with a continuity PDU 50, both ends of an OAM session have the generator function 40 and the collector function 42. Specifically, the generator function 40 is configured to generate the continuity PDUs 50, such as at a predetermined rate (e.g., every X ms). The collector function 42 is configured to monitor the reception of the continuity PDUs 50 from the opposite end and to determine a failure of the link, e.g., responsive to not receiving a certain number of the continuity PDUs 50.

In FIG. 4A, the device MD-1A and the device NID-2 operate the OAM session each having an active maintenance endpoint 30 that exchange the continuity PDUs 50. The active maintenance endpoint 30 at the device NID-1A is configured to provide received continuity PDUs 50 to the dormant maintenance endpoint 32 at the device NID-1B which updates its database 34 accordingly. In FIG. 4B, the fault 24 causes a switch from the device NID-1A to the device NID-1B. Here, the OAM session gracefully switches as well from the device NID-1A to the device NID-1B. Conversely, the now active maintenance endpoint 30 at the device NID-1B provides the received continuity PDUs 50 to the now dormant maintenance endpoint 32 at the device NID-1A.

Figure 5A:
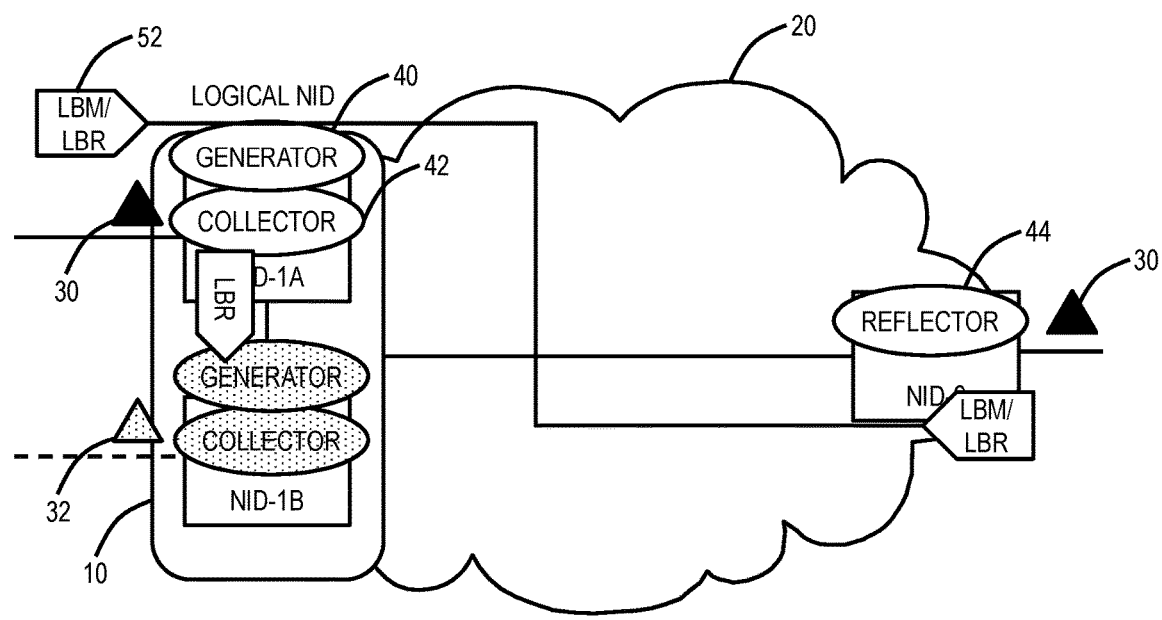
FIGS. 5A and 5B are network diagrams illustrating a loopback PDU that is shared between the devices NID-1A, NID-1B in the logical NID.
Figure 5B:
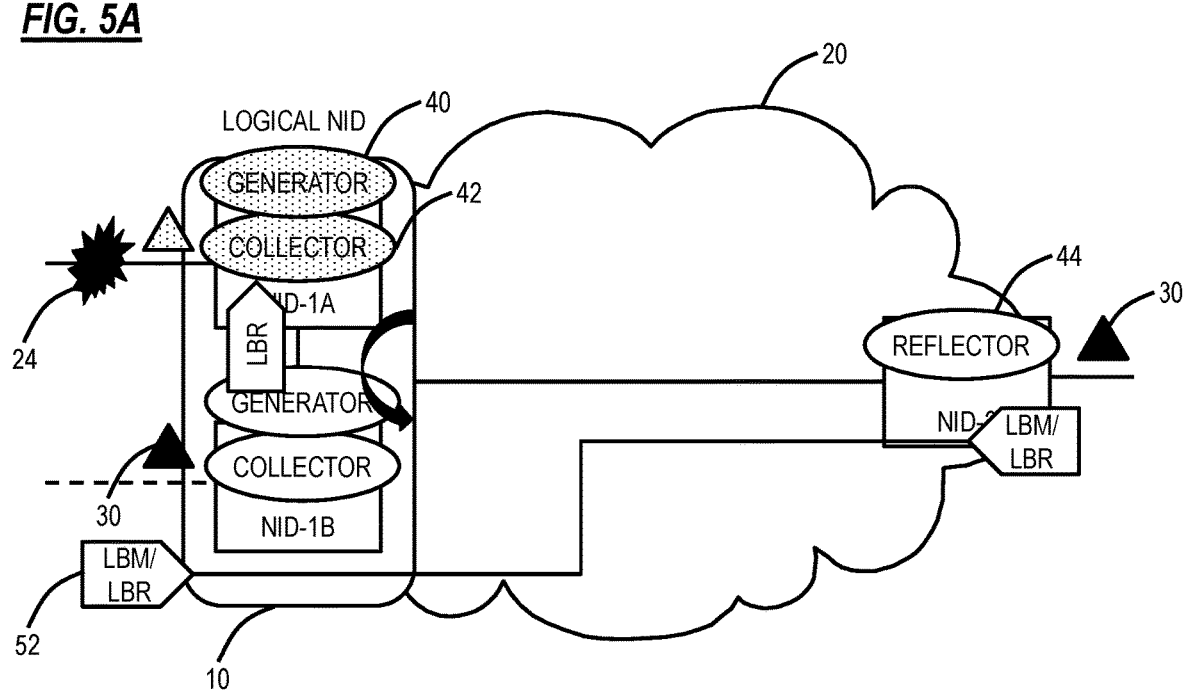

FIGS. 5A and 5B are network diagrams illustrating a loopback PDU 52 that is shared between the devices NID-1A, NID-1B in the logical NID 10. A loopback PDU 52 can be used to verify connectivity or a fault. Example instances of a loopback PDU include IEEE 802.1Q CFM Loopback Message (LBM)/Loopback Response (LBR), MPLS Virtual Circuit Connectivity Verification (VCCV) Ping or Label Switched Path (LSP) Ping, and Internet Protocol (IP) Ping.

In FIGS. 5A and 5B, with a loopback PDU 52, one end of an OAM session has the generator function 40 and the collector function 42 while the other end has the reflector function 44. The generator function 40 is configured to generate a loopback PDU 52, such as an LBM or Ping, the reflector function 44 is configured to generate another loopback PDU 52 in response to the generated loopback PDU 52, e.g., an LBR or a Ping response, and the collector function 42 is configured to receive the another loopback PDU 52 and determine the loopback based thereon.

In FIG. 5A, the device MD-1A and the device NID-2 operate the OAM session each having an active maintenance endpoint 30 that exchange the loopback PDUs 52. The active maintenance endpoint 30 at the device NID-1A is configured to provide received loopback PDUs 52 to the dormant maintenance endpoint 32 at the device NID-1B which updates its database 34 accordingly. In FIG. 5B, the fault 24 causes a switch from the device NID-1A to the device NID-1B. Here, the OAM session gracefully switches as well from the device NID-1A to the device NID-1B. Conversely, the now active maintenance endpoint 30 at the device NID-1B provides the received loopback PDUs 52 to the now dormant maintenance endpoint 32 at the device NID-1A.

Figure 6A:
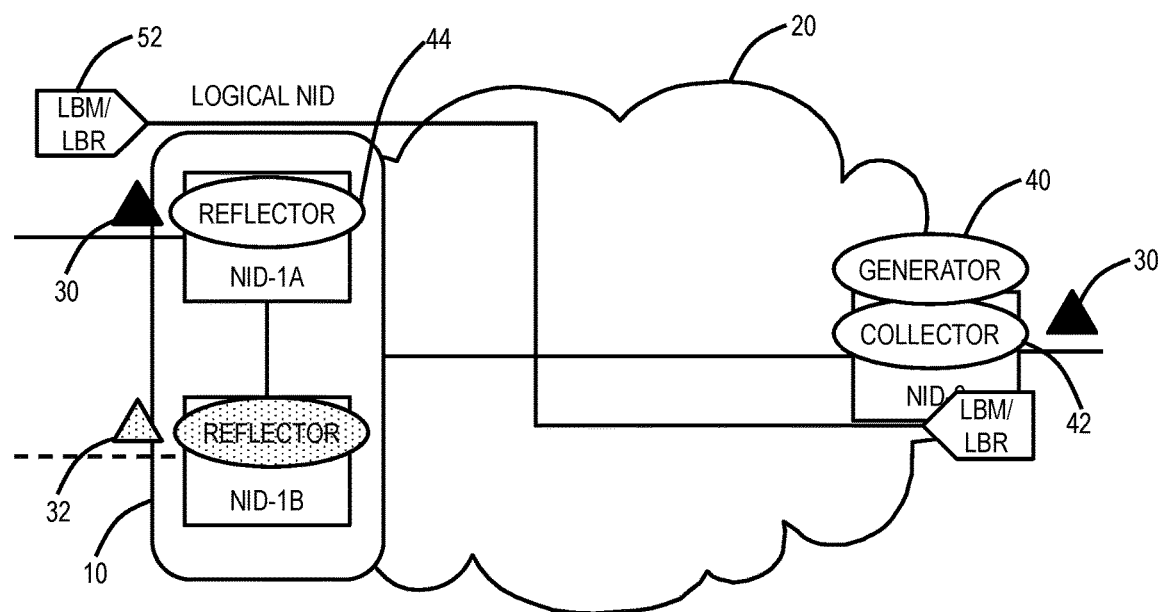
FIGS. 6A and 6B are network diagrams illustrating a loopback PDU from the device NID-2 where the devices NID-1A, NID-1B in the logical NID operate a reflector function.
Figure 6B:
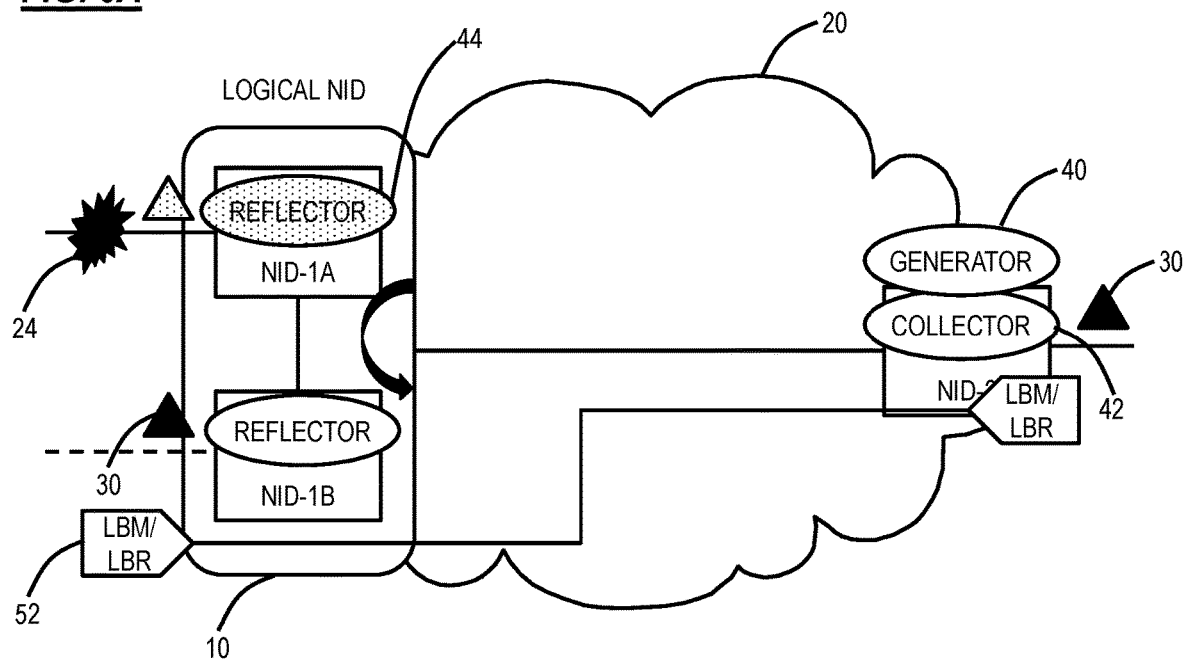

FIGS. 5A and 5B illustrate a scenario where the loopback is caused from the logical NID 10. FIGS. 6A and 6B are network diagrams illustrating a loopback PDU 52 from the device NID-2 where the devices NID-1A, NID-1B in the logical NID 10 operate a reflector function 44. Here, there is no requirement to synchronize data between the devices NID-1A, NID-1B in the logical NID 10 as they are configured to response ("reflect") to the loopback PDU 52 from the device NID-2.

Figure 7A:
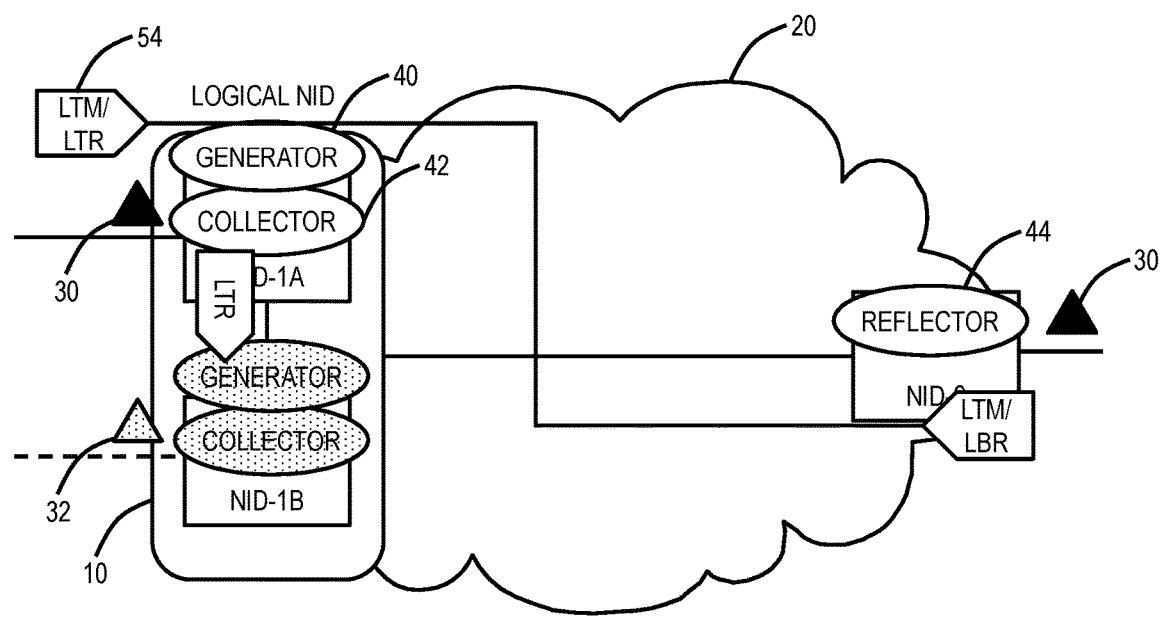
FIGS. 7A and 7B are network diagrams illustrating a linktrace PDU that is shared between the devices NID-1A, NID-1B in the logical NID.
Figure 7B:
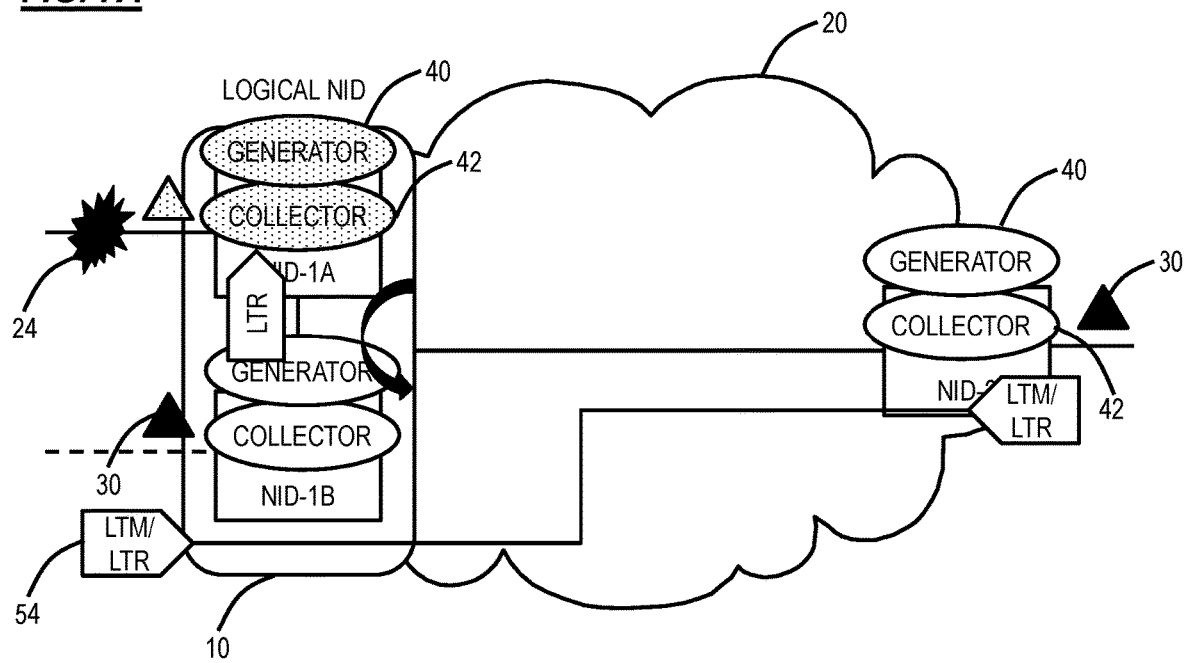

FIGS. 7A and 7B are network diagrams illustrating a linktrace PDU 54 that is shared between the devices NID-1A, NID-1B in the logical NID 10. A linktrace PDU 54 can be used to verify all nodes in a path. Example instances of a loopback PDU include IEEE 802.1Q CFM Linktrace Message (LTM)/Linktrace Response (LTR), MPLS VCCV Trace, and LSP Traceroute.

In FIGS. 7A and 7B, with a linktrace PDU 54, one end of an OAM session has the generator function 40 and the collector function 42 while the other end has the reflector function 44. The generator function 40 is configured to generate a linktrace PDU 54, such as an LTM or traceroute, the reflector function 44 is configured to generate another linktrace PDU 54 in response to the generated linktrace PDU 54, e.g., an LTR or a traceroute response, and the collector function 42 is configured to receive the another linktrace PDU 54 and determine the linktrace based thereon.

In FIG. 7A, the device MD-1A and the device NID-2 operate the OAM session each having an active maintenance endpoint 30 that exchange the linktrace PDU 54. The active maintenance endpoint 30 at the device NID-1A is configured to provide received linktrace PDU 54 to the dormant maintenance endpoint 32 at the device NID-1B which updates its database 34 accordingly. In FIG. 7B, the fault 24 causes a switch from the device NID-1A to the device NID-1B. Here, the OAM session gracefully switches as well from the device NID-1A to the device NID-1B. Conversely, the now active maintenance endpoint 30 at the device NID-1B provides the received linktrace PDU 54 to the now dormant maintenance endpoint 32 at the device NID-1A.

Figure 8A:
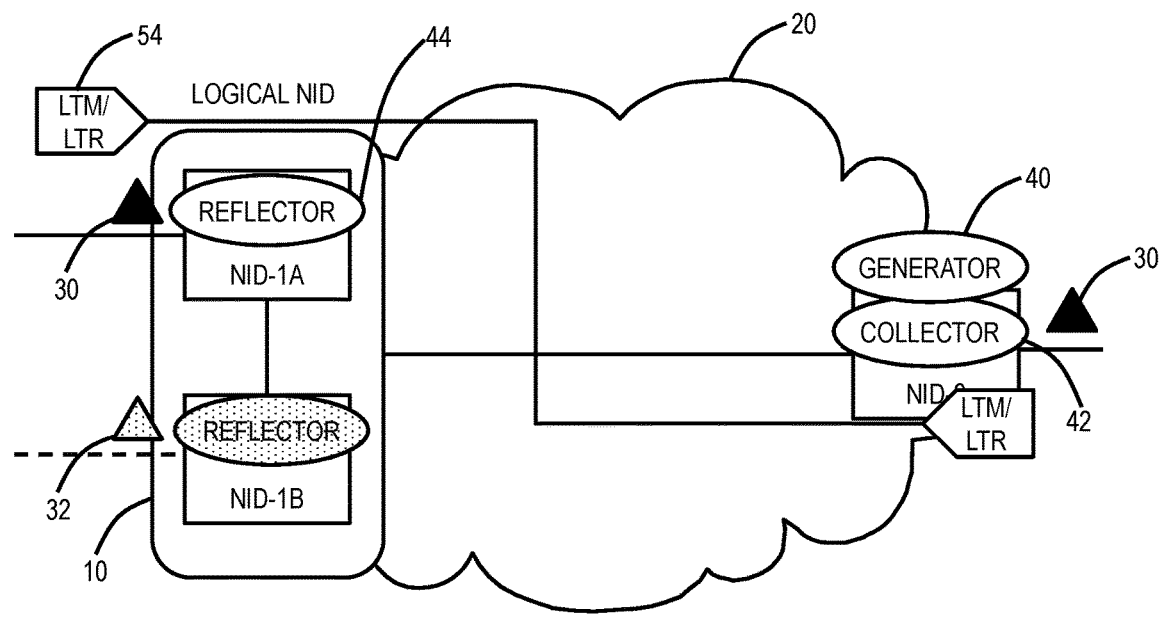
FIGS. 8A and 8B are network diagrams illustrating a linktrace PDU from the device NID-2 where the devices NID-1A, NID-1B in the logical NID operate a reflector function.
Figure 8B:
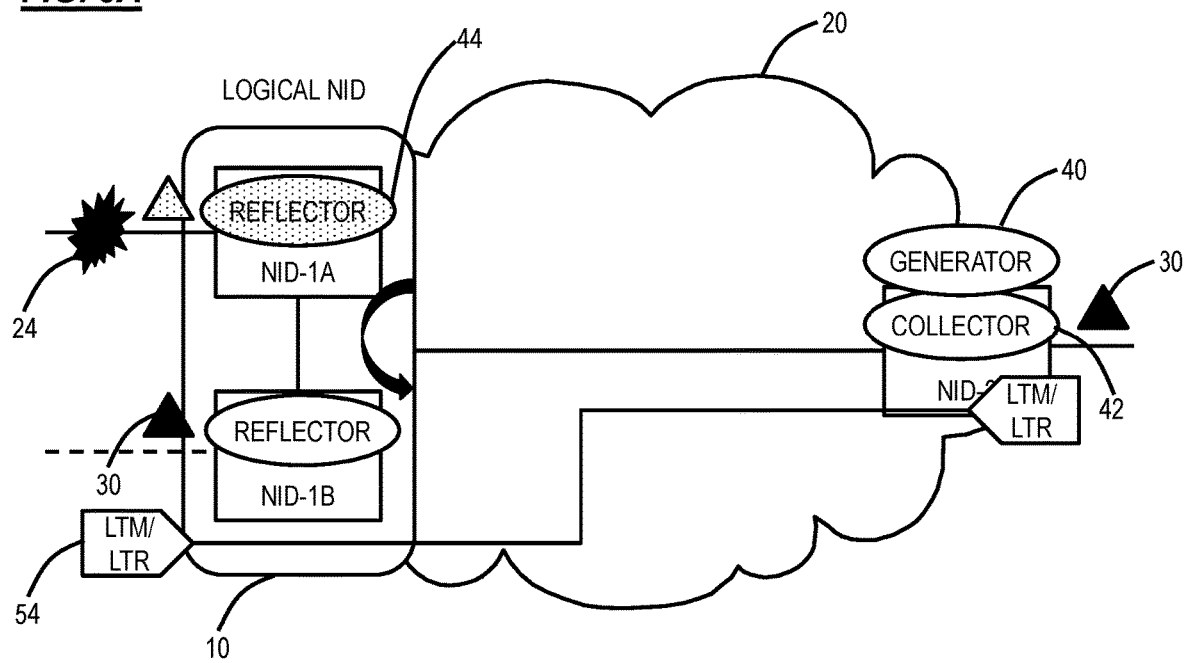

FIGS. 7A and 7B illustrate a scenario where the linktrace is caused from the logical NID 10. FIGS. 8A and 8B are network diagrams illustrating a linktrace PDU 54 from the device NID-2 where the devices NID-1A, NID-1B in the logical NID 10 operate a reflector function 44. Here, there is no requirement to synchronize data between the devices NID-1A, NID-1B in the logical NID 10 as they are configured to response ("reflect") to the linktrace PDU 54 from the device NID-2.

Figure 9A:
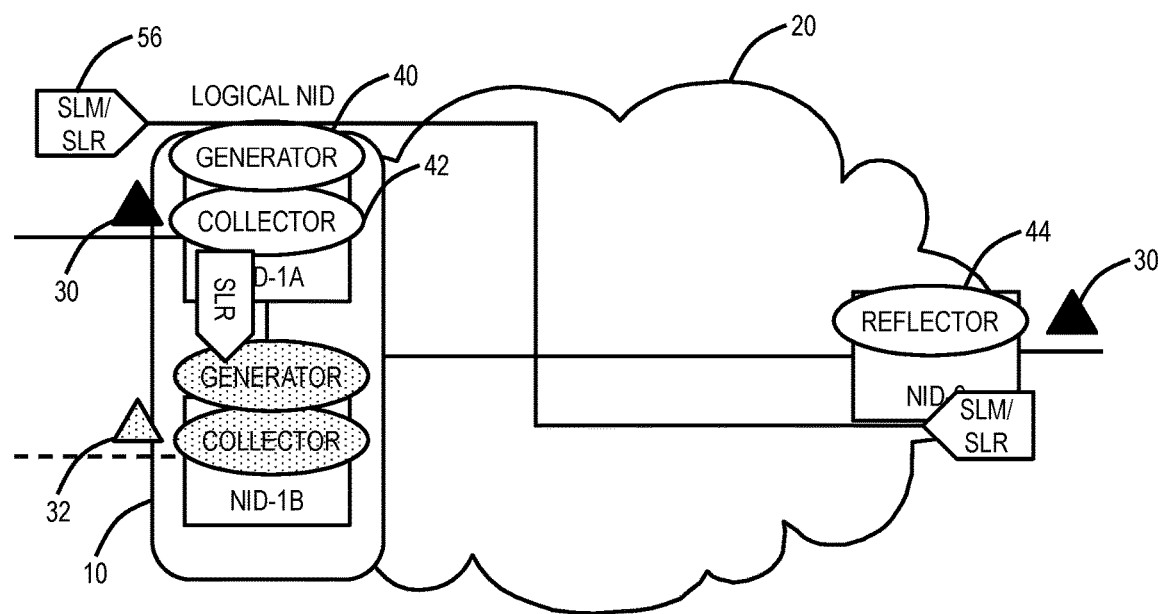
FIGS. 9A and 9B are network diagrams illustrating a loss measurement PDU that is shared between the devices NID-1A, NID-1B in the logical NID.
Figure 9B:
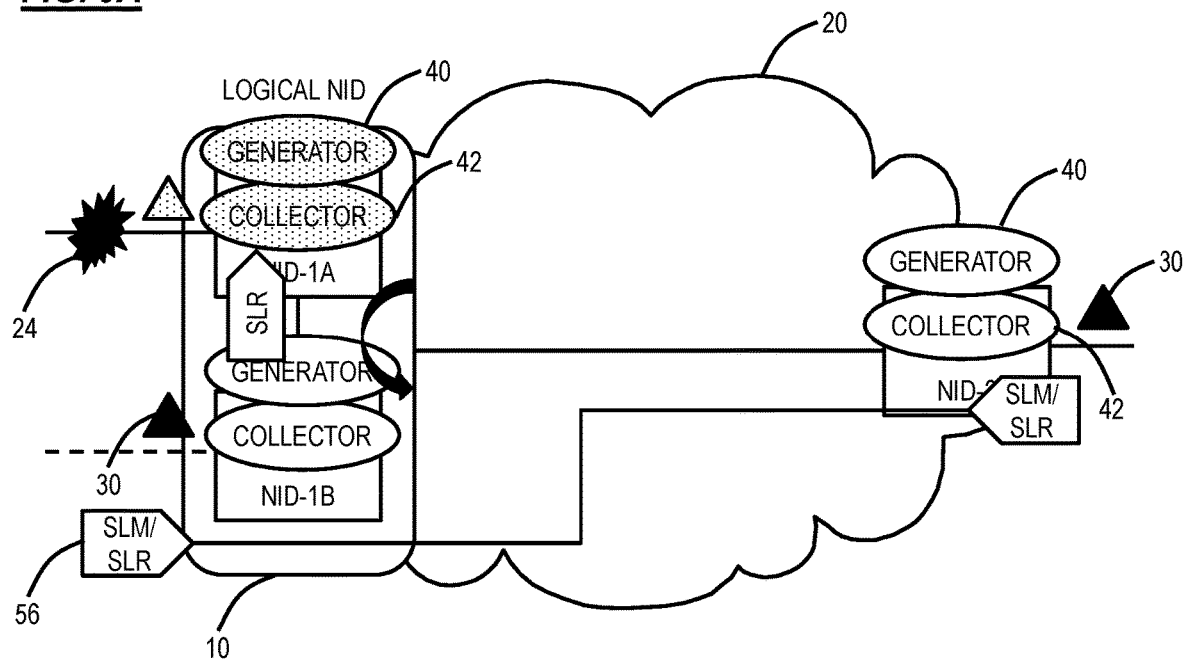
Figure 10A:
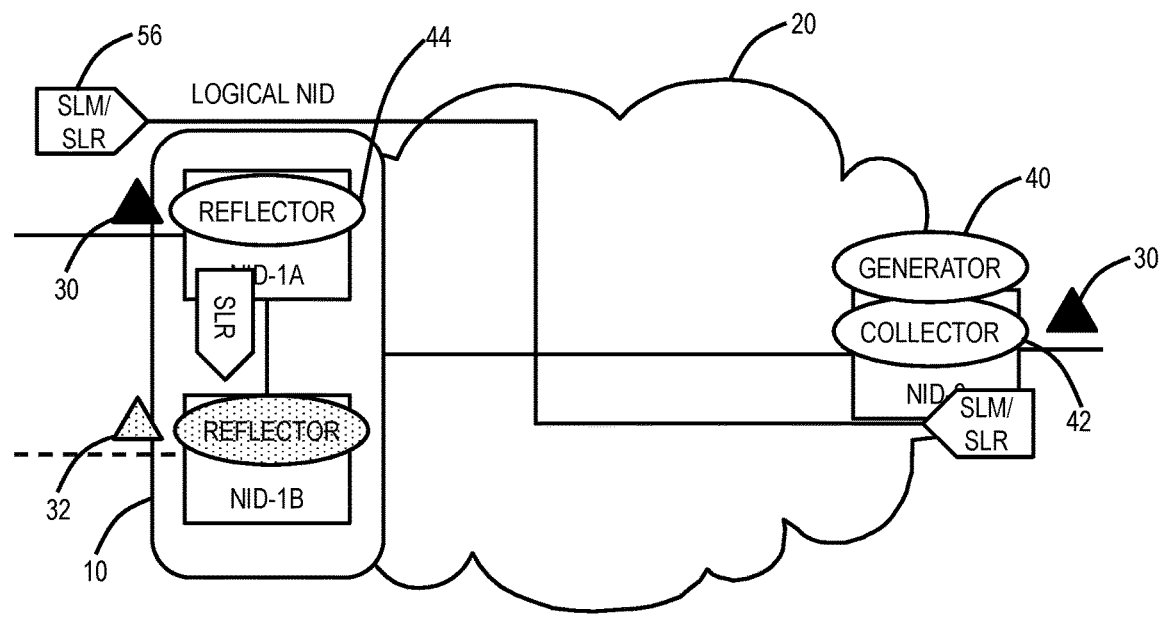
FIGS. 10A and 10B are network diagrams illustrating a loss measurement PDU from the device NID-2 where the devices NID-1A, NID-1B in the logical NID operate a reflector function.
Figure 10B:
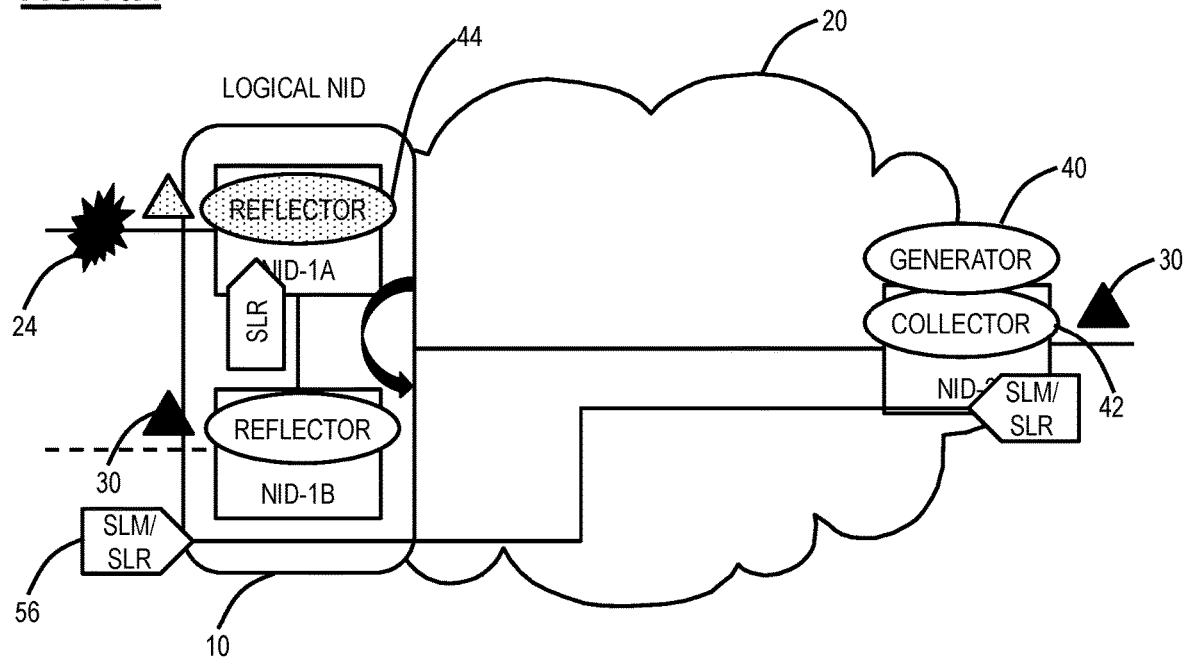
Figure 11A:
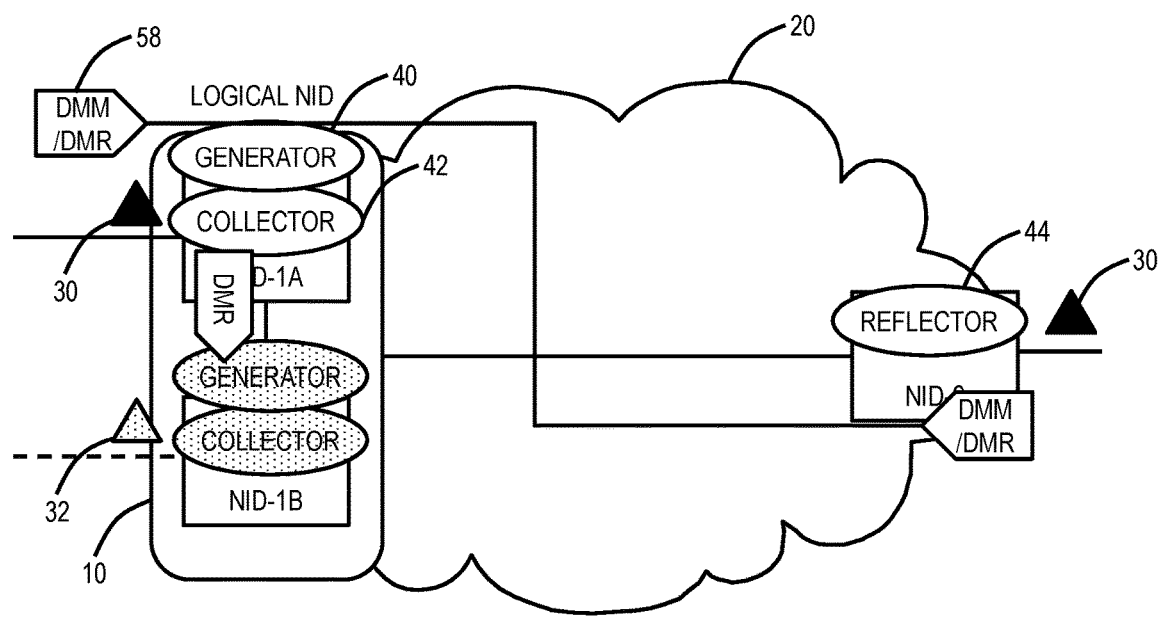
FIGS. 11A and 11B are network diagrams illustrating a delay measurement PDU that is shared between the devices NID-1A, NID-1B in the logical NID.
Figure 11B:
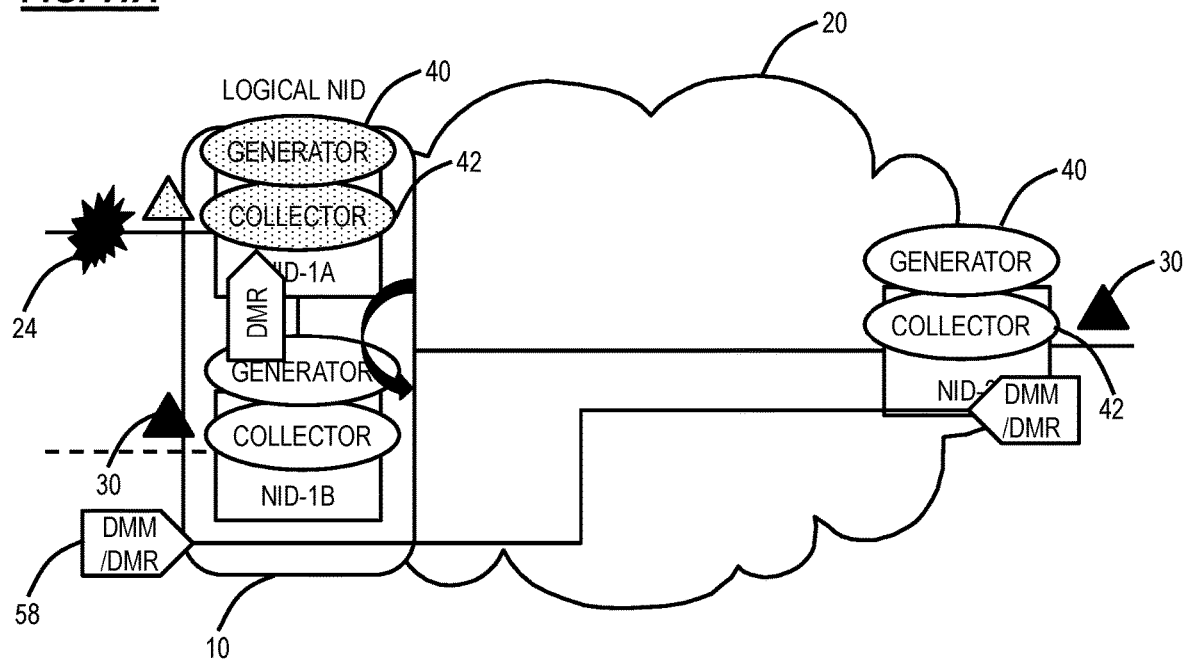
Figure 12A:
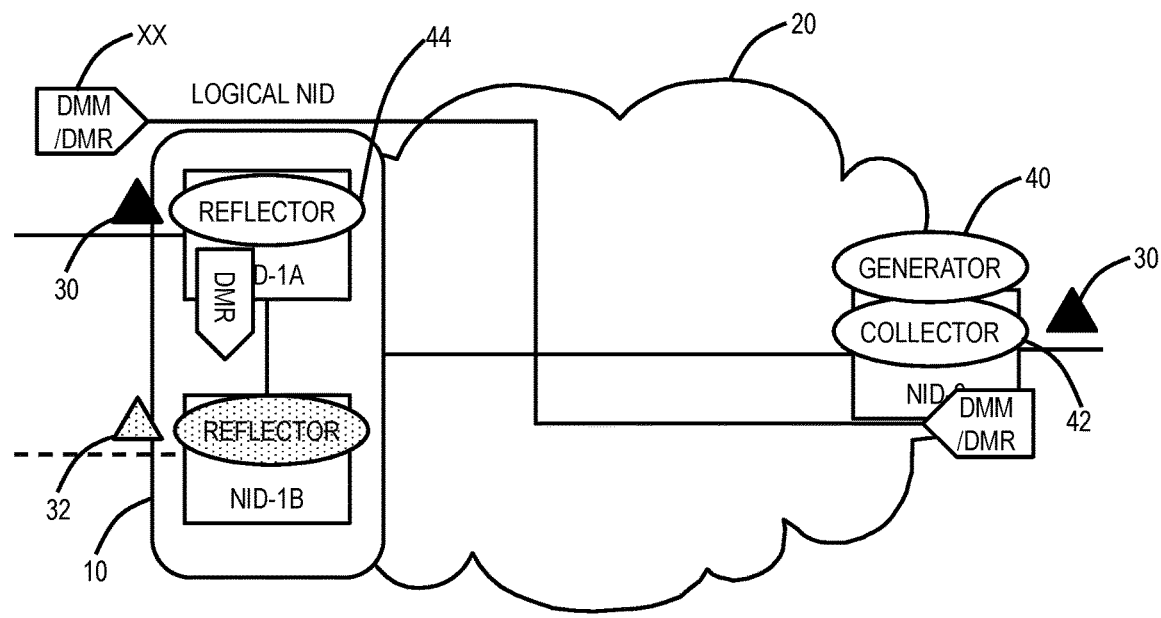
FIGS. 12A and 12B are network diagrams illustrating a delay measurement PDU from the device NID-2 where the devices NID-1A, NID-1B in the logical NID operate a reflector function.
Figure 12B:
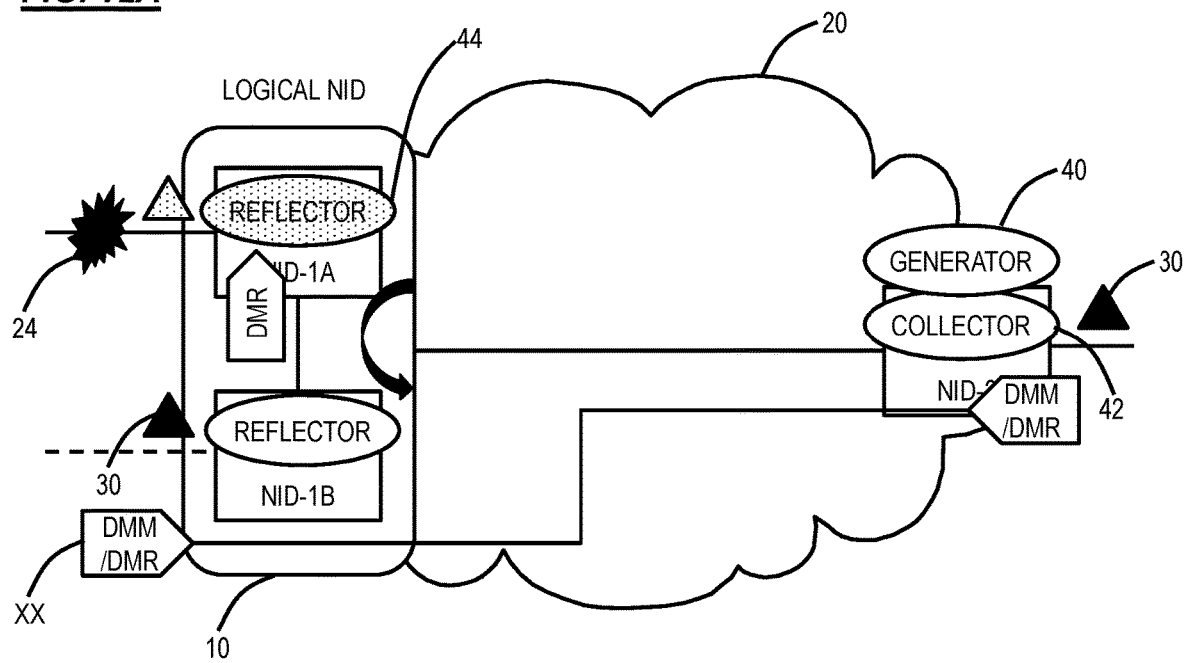

FIGS. 9A and 9B are network diagrams illustrating a loss measurement PDU 56 that is shared between the devices NID-1A, NID-1B in the logical NID 10. FIGS. 9A and 9B illustrate a scenario where the loss measurement PDU 56 is caused from the logical NID 10. FIGS. 10A and 10B are network diagrams illustrating a loss measurement PDU 56 from the device NID-2 where the devices NID-1A, NID-1B in the logical NID 10 operate a reflector function 44. FIGS. 11A and 11B are network diagrams illustrating a delay measurement PDU 58 that is shared between the devices NID-1A, NID-1B in the logical NID 10. FIGS. 11A and 11B illustrate a scenario where the delay measurement PDU 58 is caused from the logical MD 10. FIGS. 12A and 12B are network diagrams illustrating a delay measurement PDU 58 from the device NID-2 where the devices NID-1A, NID-1B in the logical NID 10 operate a reflector function 44.

A loss measurement PDU 56 can be used to measure loss in a path, whereas a delay measurement PDU 58 is used to measure the delay in a path. Example instances of a loss measurement PDU 56 include ITU-T Y.1731 Synthetic Loss Message (SLM)/Synthetic Loss Response (SLR), and IETF RFC 6374 Packet Loss and Delay Measurement for MPLS, the contents of which are incorporated by reference herein. Example instances of a delay measurement PDU 58 include ITU-T Y.1731 Delay Measurement Message (DMM)/Delay Measurement Response (DMR)), and IETF RFC 6374 Packet Loss and Delay Measurement for MPLS, the contents of which are incorporated by reference herein.

In FIGS. 9A, 9B, 11A, and 11B, with a loss measurement PDU 56 or a delay measurement PDU 58, one end of an OAM session has the generator function 40 and the collector function 42 while the other end has the reflector function 44. The generator function 40 is configured to generate a loss measurement PDU 56 or a delay measurement PDU 58, the reflector function 44 is configured to generate another loss measurement PDU 56 or a delay measurement PDU 58 in response to the generated loss measurement PDU 56 or a delay measurement PDU 58, and the collector function 42 is configured to receive the another loss measurement PDU 56 or a delay measurement PDU 58 and determine the loss or delay based thereon.

In FIGS. 9A and 11A, the device NID-1A and the device NID-2 operate the OAM session each having an active maintenance endpoint 30 that exchange the loss measurement PDU 56 or a delay measurement PDU 58. The active maintenance endpoint 30 at the device NID-1A is configured to provide received loss measurement PDU 56 or delay measurement PDU 58 to the dormant maintenance endpoint 32 at the device NID-1B which updates its database 34 accordingly. In FIGS. 9B and 11B, the fault 24 causes a switch from the device NID-1A to the device NID-1B. Here, the OAM session gracefully switches as well from the device NID-1A to the device NID-1B. Conversely, the now active maintenance endpoint 30 at the device NID-1B provides the received loss measurement PDU 56 or delay measurement PDU 58 to the now dormant maintenance endpoint 32 at the device NID-1A.

FIGS. 9A, 9B, 11A, and 11B illustrate a scenario where the loss or delay measurement is caused from the logical NID 10. FIGS. 10A, 10B, 12A, and 12B are network diagrams illustrating a loss measurement PDU 56 or a delay measurement PDU 58 from the device NID-2 where the devices NID-1A, NID-1B in the logical NID 10 operate a reflector function 44. Here, it is possible to synchronize data between the devices NID-1A, NID-1B in the logical NID 10 by providing the response data in the SLR or DMR such that the dormant maintenance endpoint 32 has the associated data that was sent back by the active maintenance endpoint 30. In another embodiment, there is no need to synchronize this "reflected" data.

Approach #2—Distribution of OAM Session Information in the Logical NID

The second approach includes the active maintenance endpoint 30 in the logical NID 10 providing OAM session information to the dormant maintenance endpoint 32, such as over the communication interface 22. If the logical NID 10 is performing the generator/collector functions at the active maintenance endpoint 30, then it will transmit relevant information to the dormant maintenance endpoint 32 so that it can synchronize its database 34. If the logical NID 10 is performing the reflector function at the active maintenance endpoint 30, then it will dispatch relevant information of the reflected session OAM PDU to the dormant maintenance endpoint 32.

In this manner, the dormant maintenance endpoint 32 has the associated database 34 up to date with the corresponding database 34 at the active maintenance endpoint 30. That is, by sharing the relevant information with the dormant maintenance endpoint 32, the inactive device (within the logical NID 10) can maintain its own OAM session database 34 in a consistent manner with the OAM session database 34 at the active maintenance endpoint 30. Consequently, when a switchover occurs within the logical NID 10, the OAM session can be gracefully maintained uninterrupted and can be transparent to the peer maintenance endpoint at the device NID-2 participating in the OAM session.

FIGS. 13-21 are various network diagrams illustrating the second approach with example PDUs for continuity checks, loopbacks, link trace, synthetic loss, and delay measurement. Those of ordinary skill in the art will recognize other types of PDUs are also contemplated. Further, the example PDUs in FIGS. 13-21 can be the same as the PDUs described herein with reference to FIGS. 4-12.

Figure 13A:
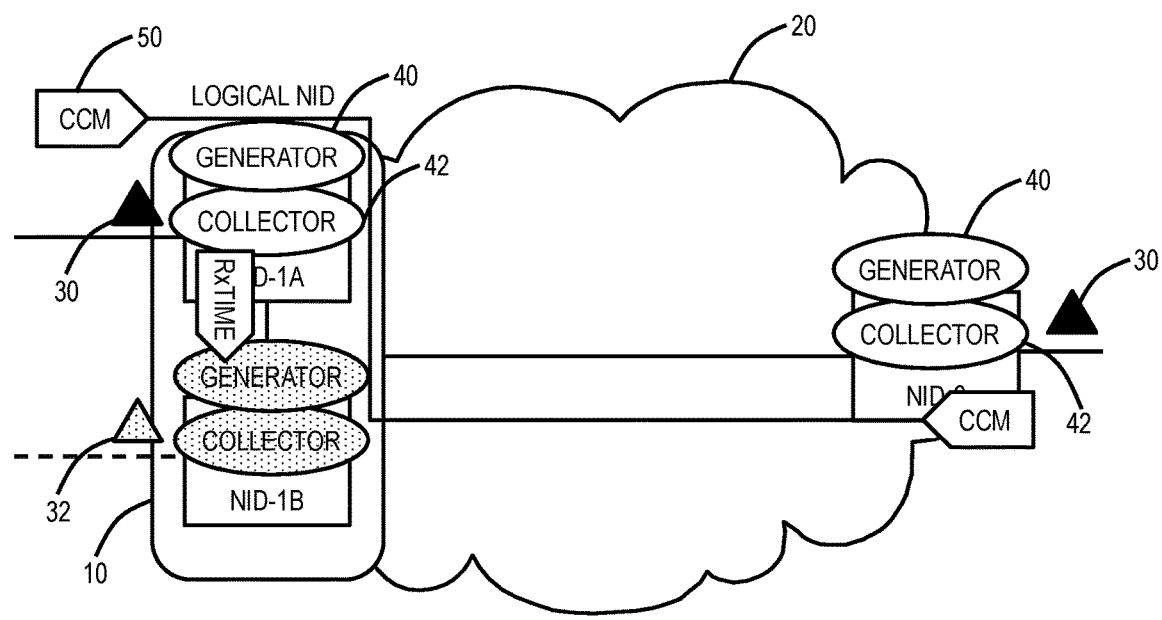
FIGS. 13A and 13B are network diagrams illustrating a continuity check PDU with its relevant information shared between the devices NID-1A, NID-1B in the logical NID.
Figure 13B:
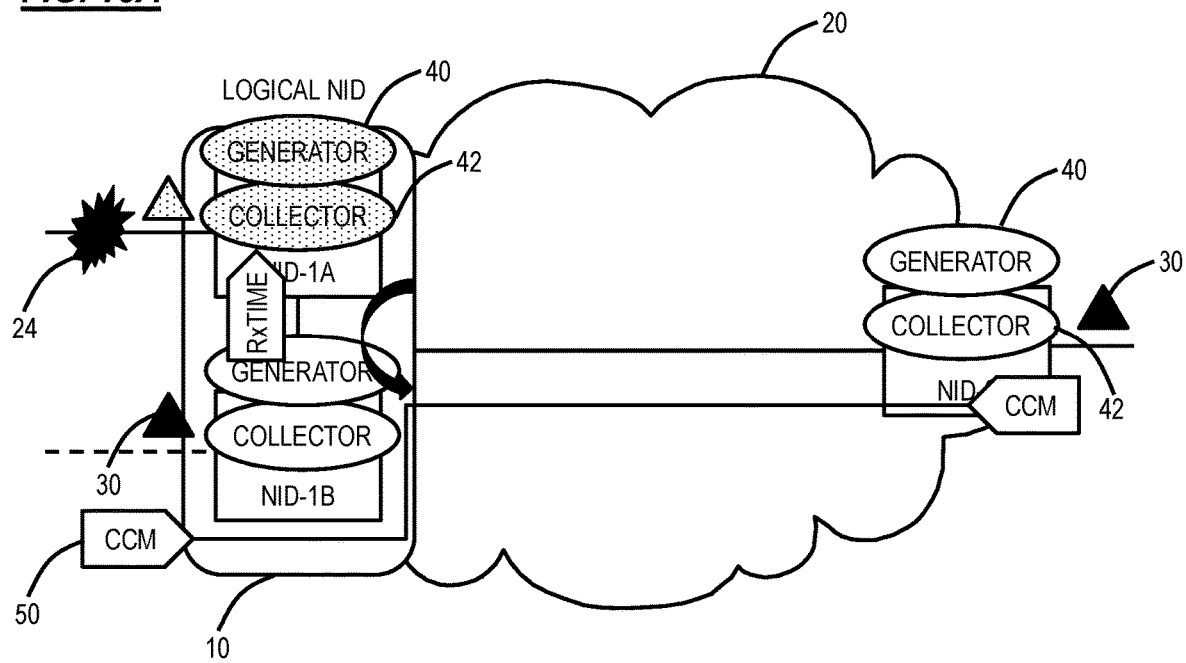

FIGS. 13A and 13B are network diagrams illustrating a continuity check PDU 50 with its relevant information shared between the devices NID-1A, NID-1B in the logical MD 10. Here, in contrast to FIGS. 4A and 4B, the active maintenance endpoint 30 provides the relevant information which can include the receive time of the last continuity check PDU 50. The dormant maintenance endpoint 32 can use the receive time to adjust its own timer or counter.

Figure 14A:
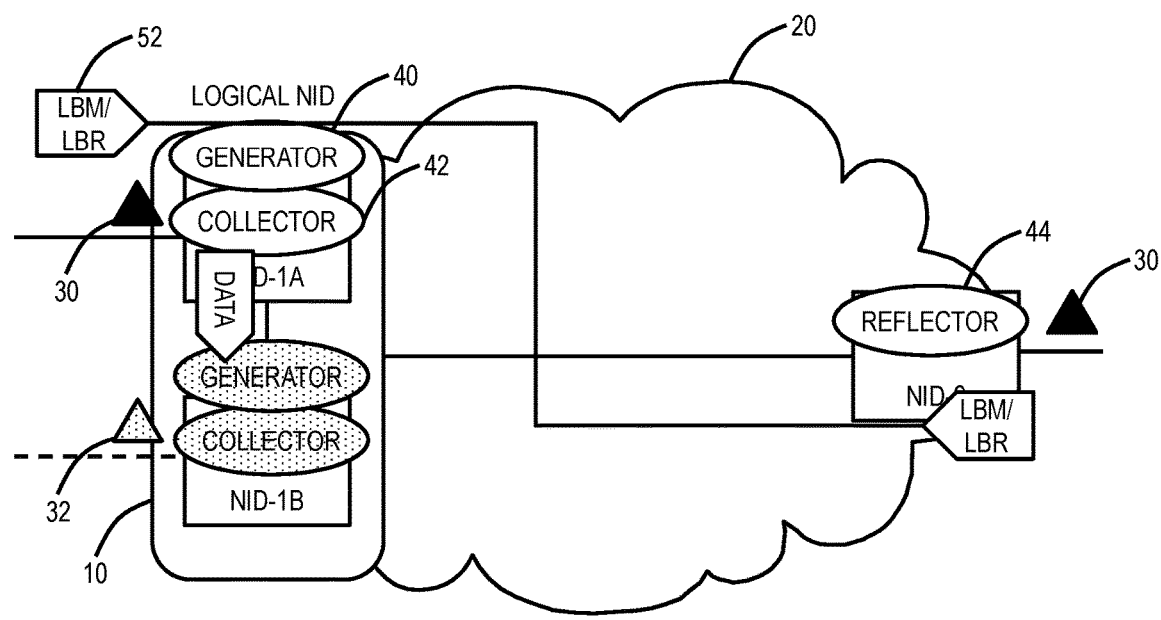
FIGS. 14A and 14B are network diagrams illustrating a loopback PDU with its relevant information shared between the devices NID-1A, NID-1B in the logical NID.
Figure 14B:
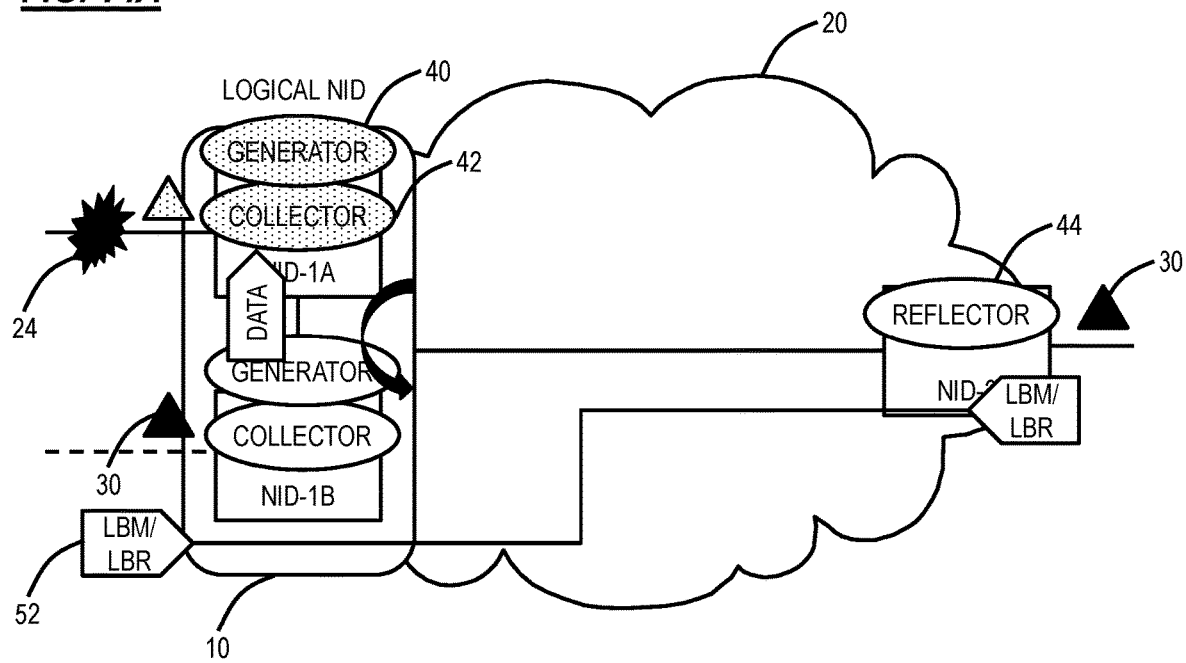
Figure 15A:
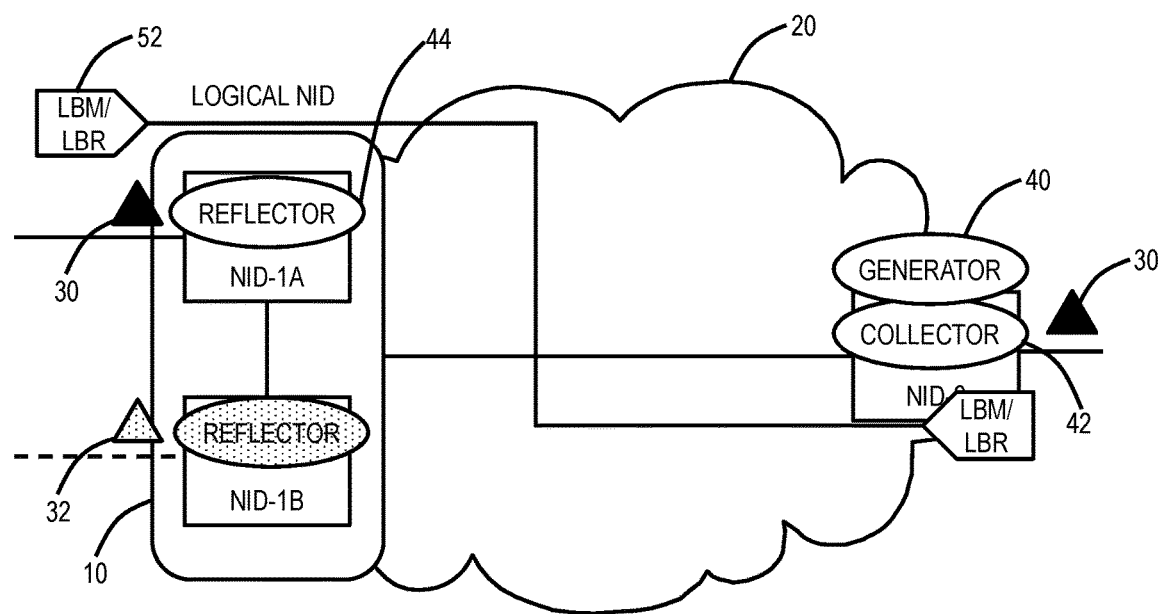
FIGS. 15A and 15B are network diagrams illustrating a loopback PDU from the device NID-2 where the devices NID-1A, NID-1B in the logical NID operate a reflector function.
Figure 15B:
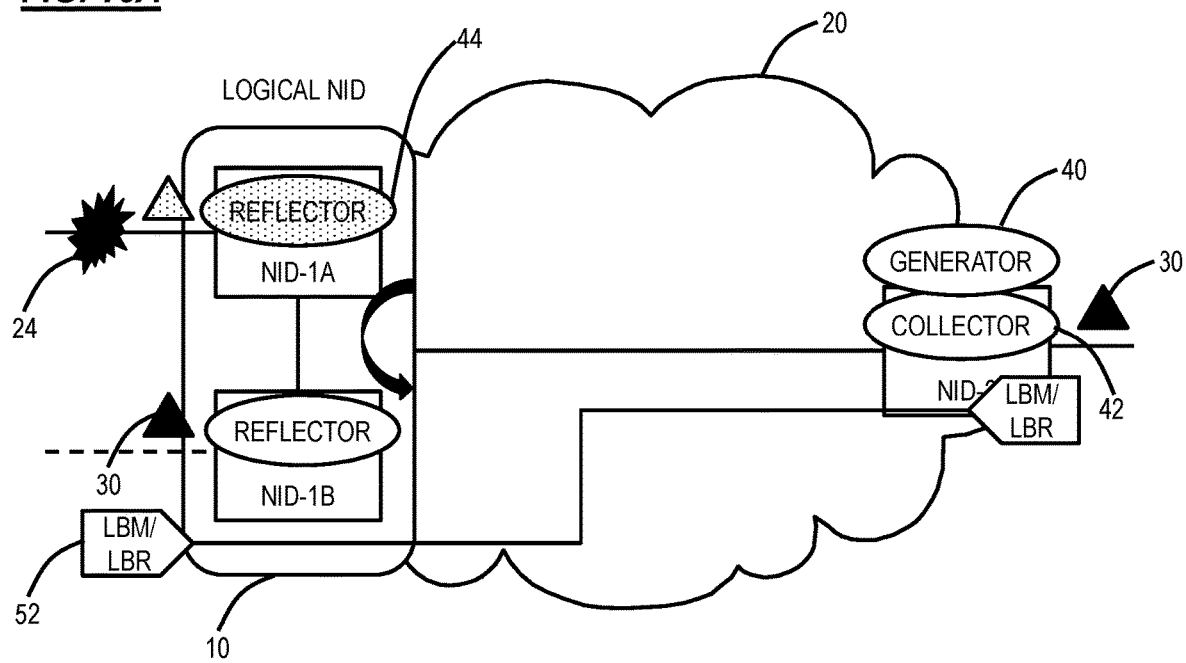

FIGS. 14A and 14B are network diagrams illustrating a loopback PDU 52 with its relevant information shared between the devices NID-1A, NID-1B in the logical NID 10. Here, in contrast to FIGS. 5A and 5B, the active maintenance endpoint 30 provides the relevant information which can include the (a) the current Transaction ID (e.g., Sequence Number) and (b) the number of LBMs transmitted within this session to the dormant "generator/collector." The Dormant "generator/collector" will use this value to set its own data. FIGS. 14A and 14B illustrate a scenario where the loopback is caused from the logical NID 10. FIGS. 15A and 15B are network diagrams illustrating a loopback PDU 52 from the device NID-2 where the devices NID-1A, NID-1B in the logical NID 10 operate a reflector function 44. As in FIGS. 6A and 6B, there is no need to share information in FIGS. 15A and 15B when the dormant maintenance endpoint 32 has the reflector function 44.

Figure 16A:
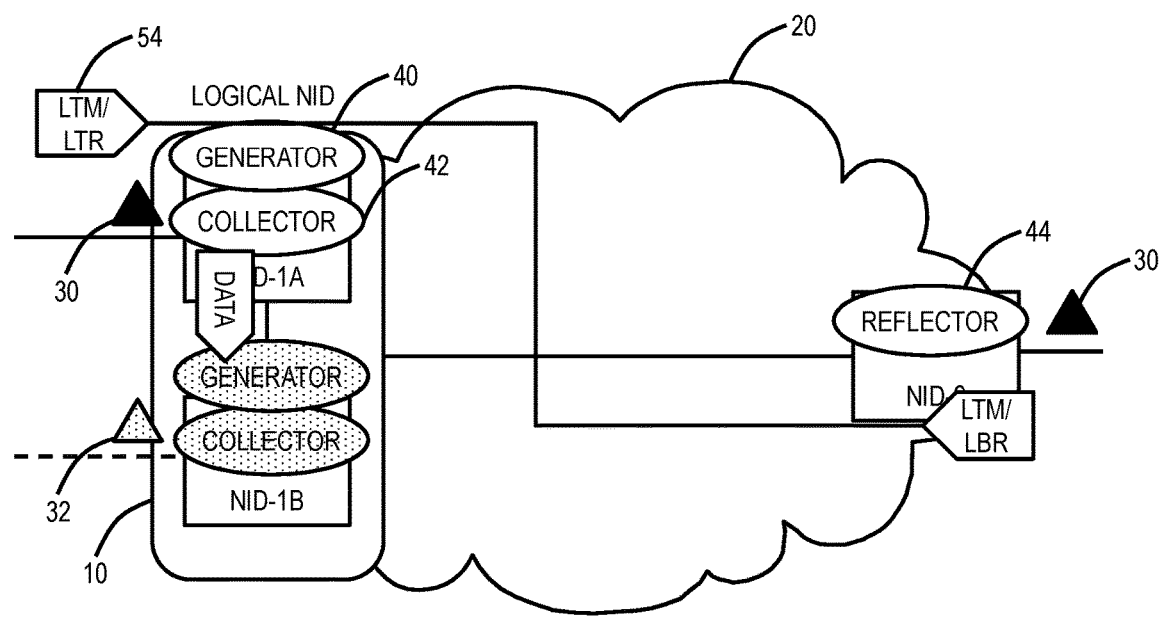
FIGS. 16A and 16B are network diagrams illustrating a linktrace PDU with its relevant information shared between the devices NID-1A, NID-1B in the logical NID.
Figure 16B:
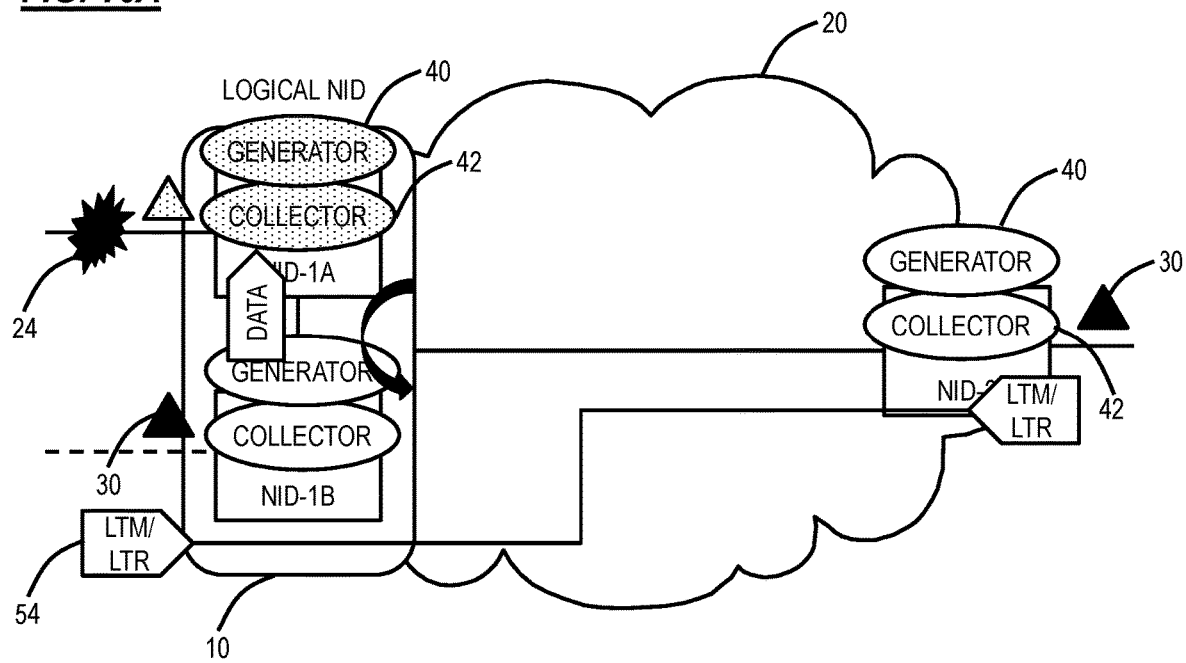
Figure 17A:
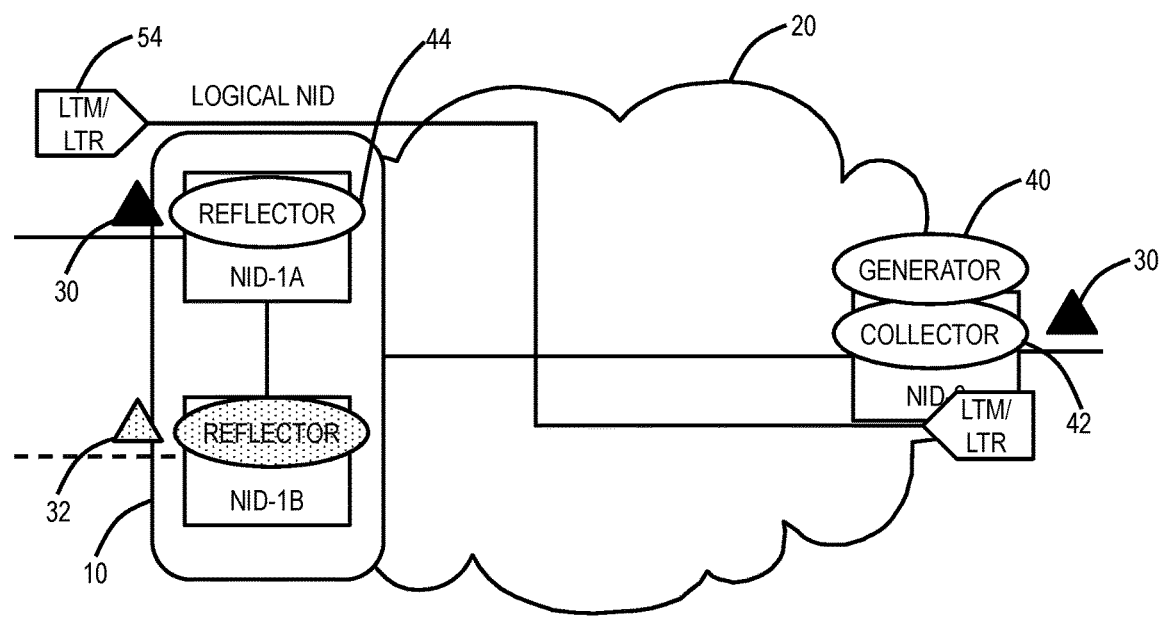
FIGS. 17A and 17B are network diagrams illustrating a linktrace PDU from the device NID-2 where the devices NID-1A, NID-1B in the logical NID operate a reflector function.
Figure 17B:
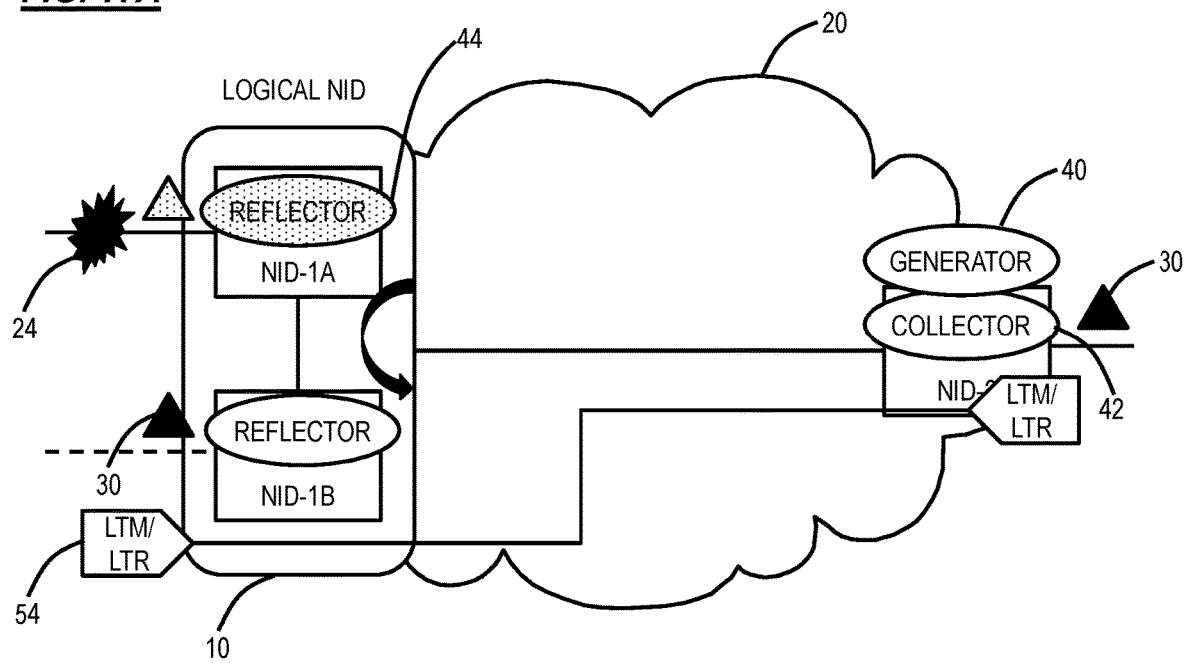

FIGS. 16A and 16B are network diagrams illustrating a linktrace PDU 54 with its relevant information shared between the devices NID-1A, NID-1B in the logical NID 10. Here, in contrast to FIGS. 7A and 7B, the active maintenance endpoint 30 provides the relevant information which can include the current Transaction ID to the dormant "generator/collector." The dormant "generator/collector" will use this value to set its own data. FIGS. 16A and 16B illustrate a scenario where the linktrace is caused from the logical NID 10. FIGS. 17A and 17B are network diagrams illustrating a linktrace PDU 54 from the device NID-2 where the devices NID-1A, NID-1B in the logical NID 10 operate a reflector function 44. As in FIGS. 8A and 8B, there is no need to share information in FIGS. 17A and 17B when the dormant maintenance endpoint 32 has the reflector function 44.

Figure 18A:
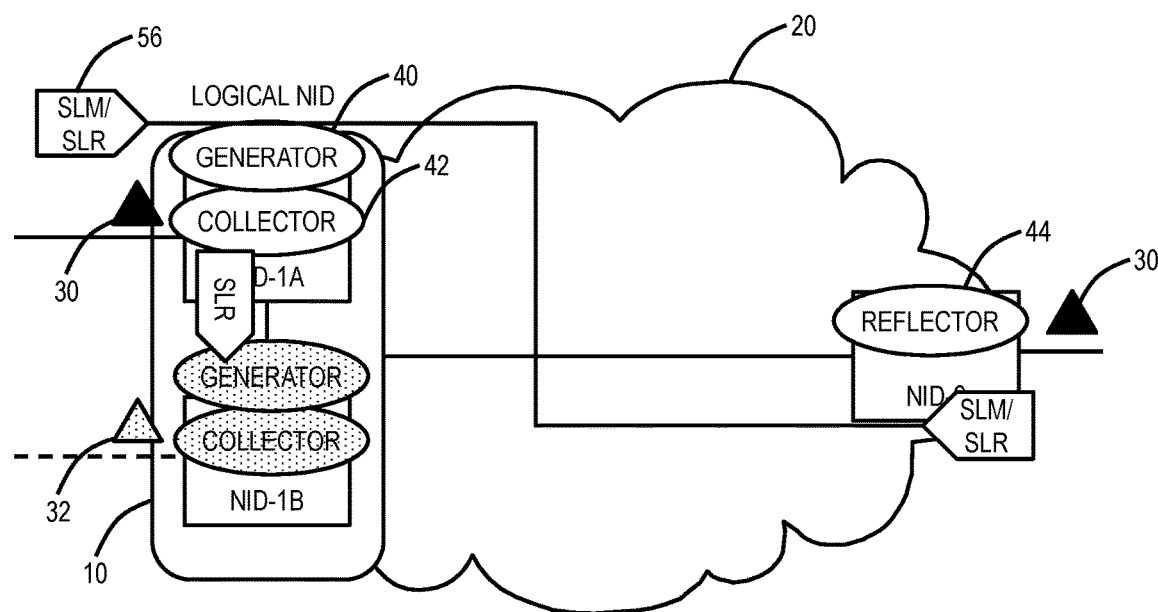
FIGS. 18A and 18B are network diagrams illustrating a loss measurement PDU with its relevant information shared between the devices NID-1A, NID-1B in the logical NID.
Figure 18B:
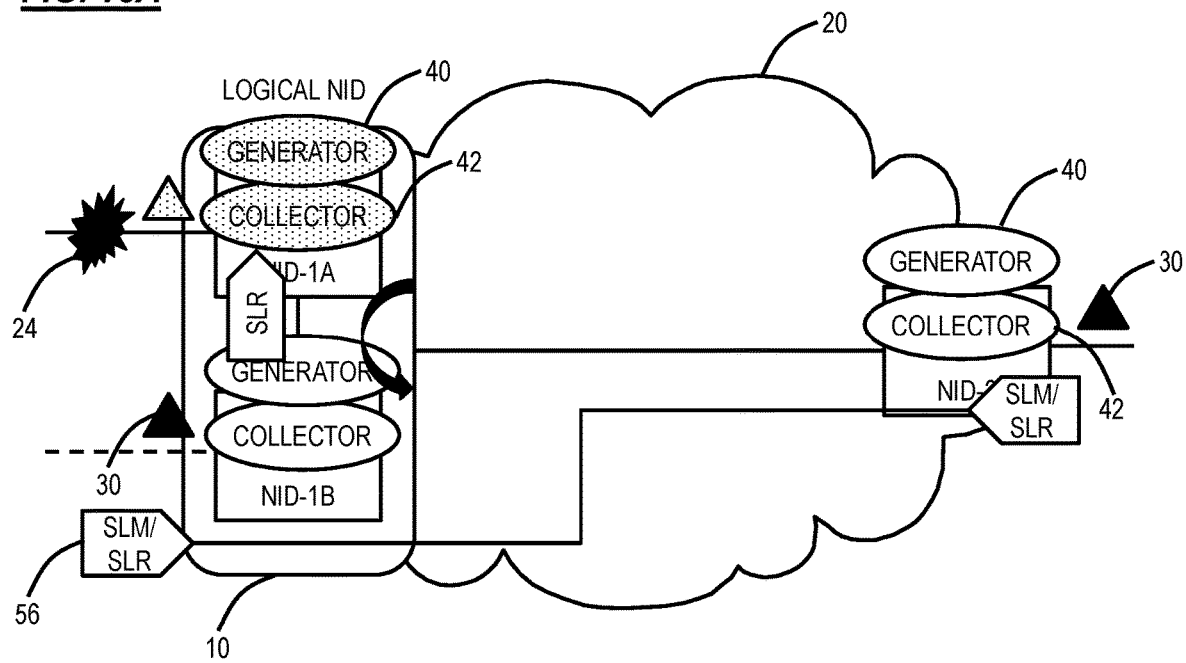
Figure 19A:
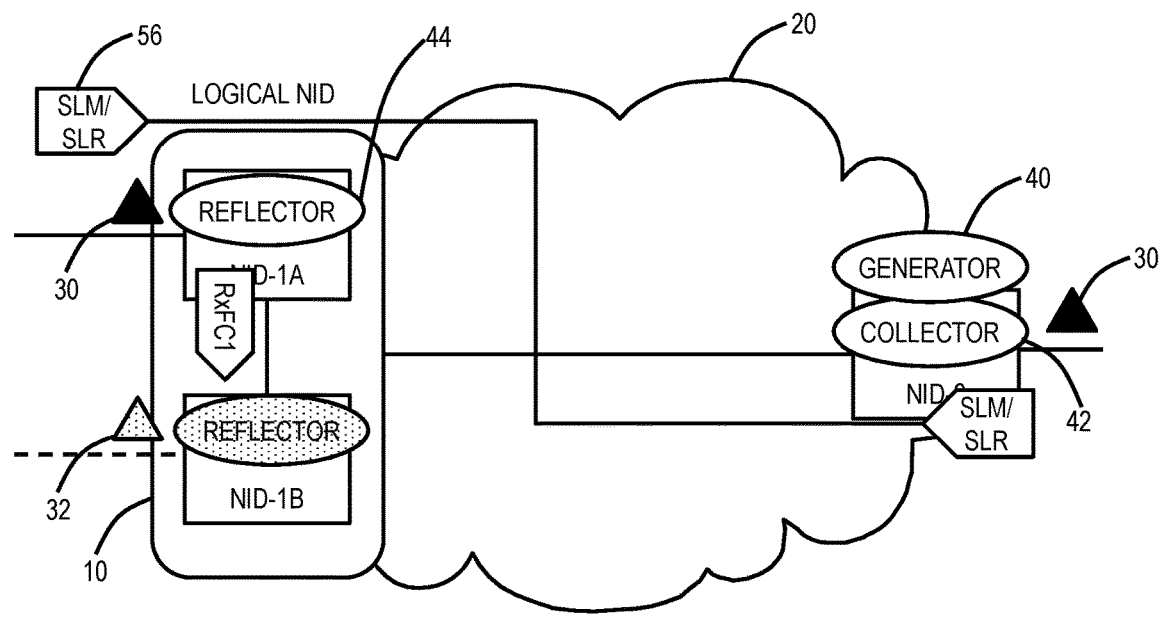
FIGS. 19A and 19B are network diagrams illustrating a loss measurement PDU from the device NID-2 where the devices NID-1A, NID-1B in the logical NID operate a reflector function.
Figure 19B:
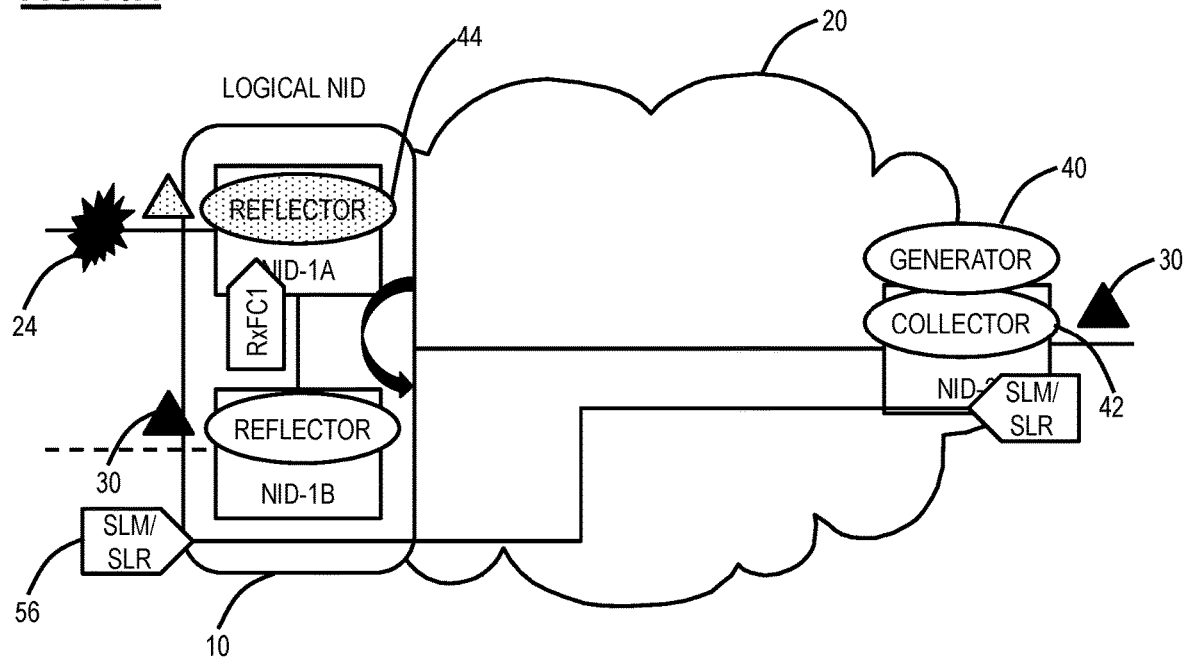
Figure 20A:
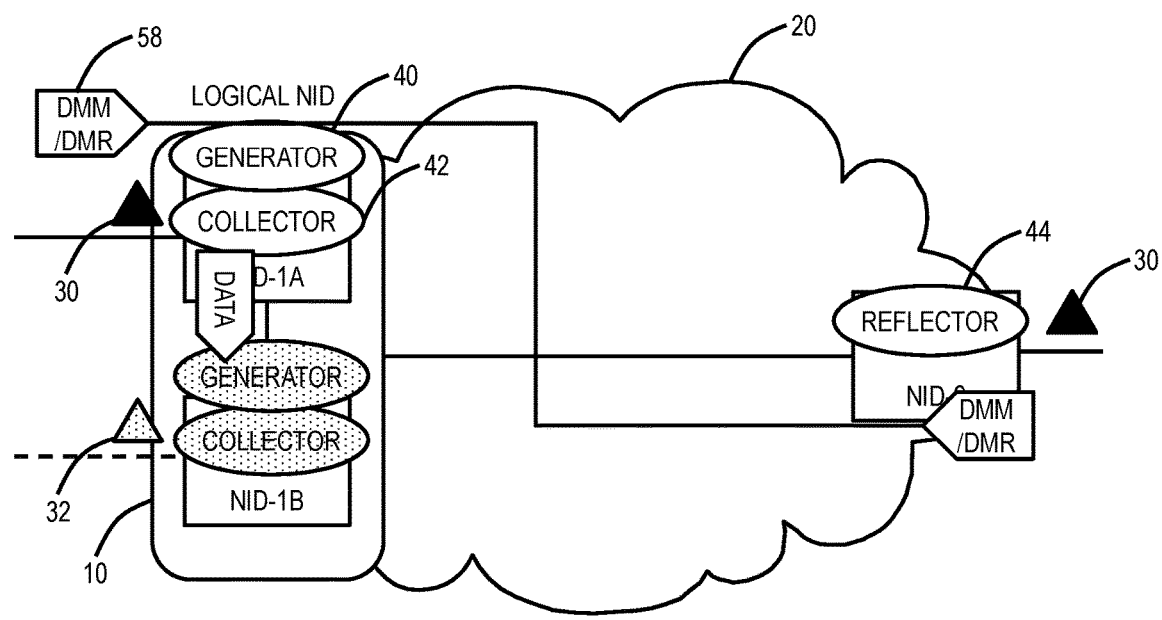
FIGS. 20A and 20B are network diagrams illustrating a delay measurement PDU that is shared between the devices NID-1A, NID-1B in the logical NID.
Figure 20B:
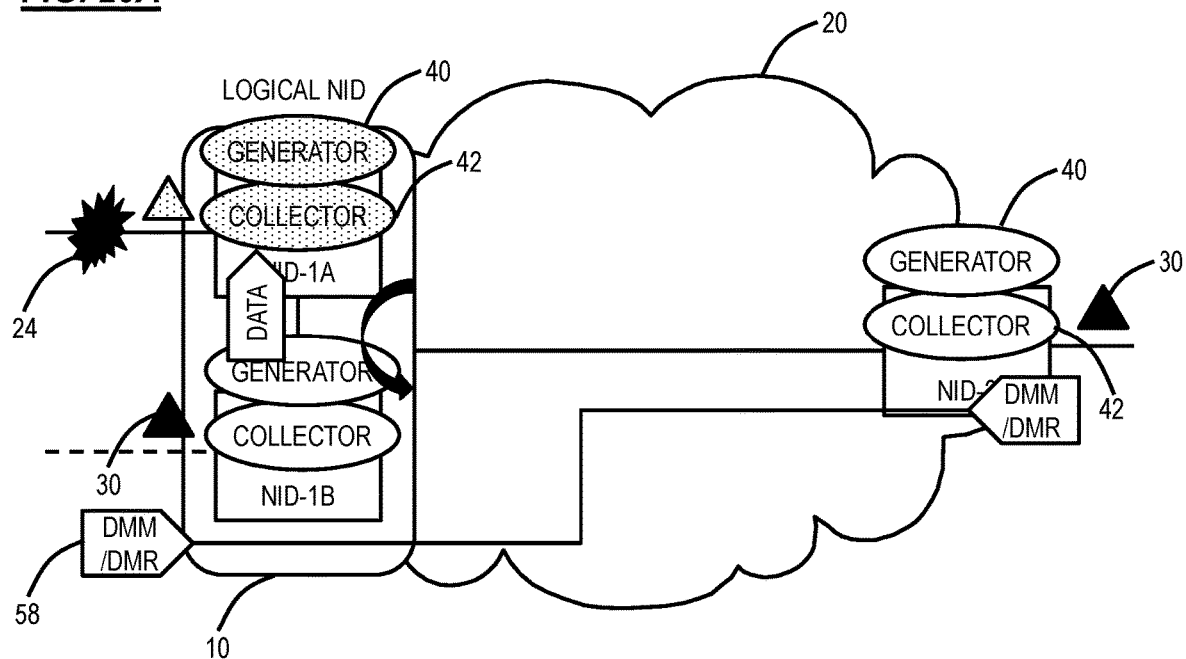
Figure 21A:
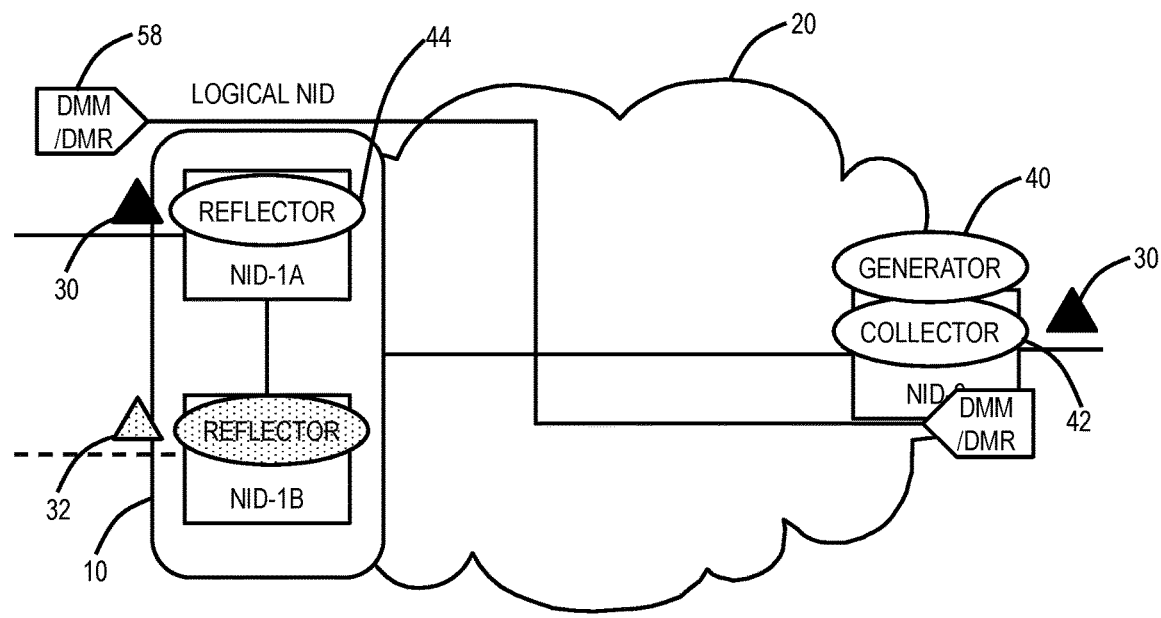
FIGS. 21A and 21B are network diagrams illustrating a delay measurement PDU from the device NID-2 where the devices NID-1A, NID-1B in the logical NID operate a reflector function.
Figure 21B:
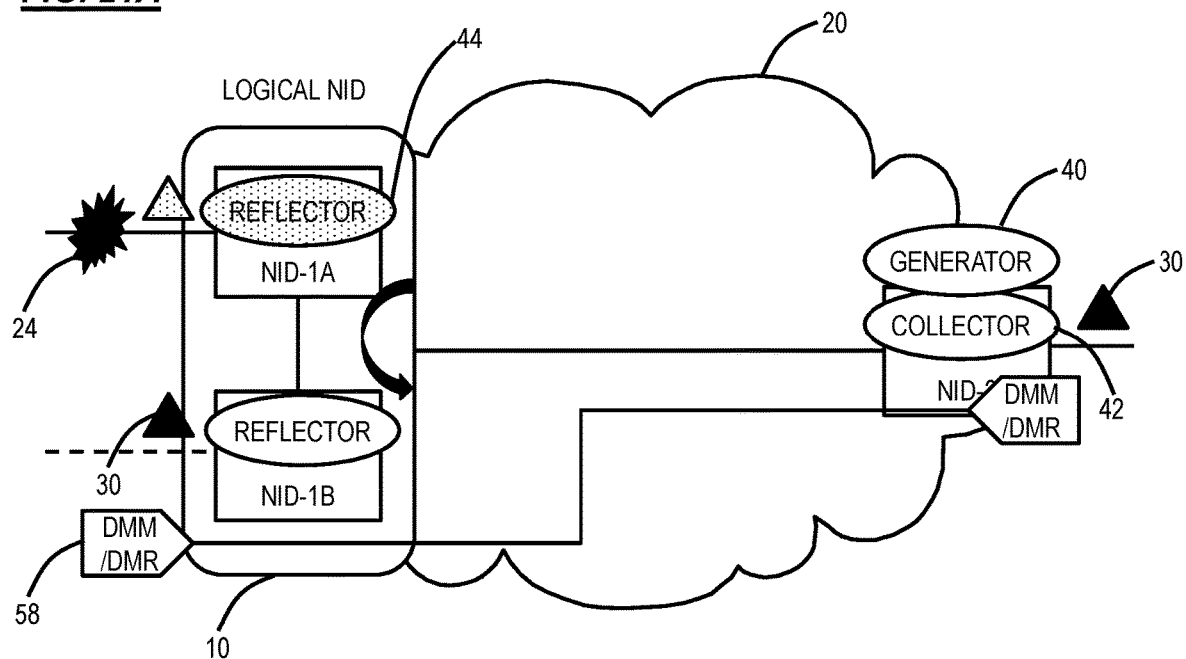

FIGS. 18A and 18B are network diagrams illustrating a loss measurement PDU 56 with its relevant information shared between the devices NID-1A, NID-1B in the logical NID 10. FIGS. 18A and 18B illustrate a scenario where the loss measurement PDU 56 is caused from the logical NID 10. FIGS. 19A and 19B are network diagrams illustrating a loss measurement PDU 56 from the device NID-2 where the devices NID-1A, NID-1B in the logical NID 10 operate a reflector function 44. FIGS. 20A and 20B are network diagrams illustrating a delay measurement PDU 58 that is shared between the devices NID-1A, NID-1B in the logical NID 10. FIGS. 20A and 20B illustrate a scenario where the delay measurement PDU 58 is caused from the logical NID 10. FIGS. 21A and 21B are network diagrams illustrating a delay measurement PDU 58 from the device NID-2 where the devices NID-1A, NID-1B in the logical NID 10 operate a reflector function 44.

In FIGS. 18A and 18B, for the relevant information in loss measurement, the active maintenance endpoint 30 can provide the {min, max, avg, current} frame loss measurement data to the dormant "generator/collector." The dormant "generator/collector" will use this value to set its own data. In FIGS. 19A and 19B, the active maintenance endpoint 30 reflector function 44 can provide counter information (e.g., RxFC1) to the dormant maintenance endpoint 32.

In FIGS. 20A and 20B, for the relevant information in delay measurement, the active maintenance endpoint 30 can provide the {min, max, avg, current} measurement data to the dormant "generator/collector." The dormant "generator/collector" will use this value to set its own data. In FIGS. 21A and 21B, there is no data synchronization necessary.

Process

Figure 22:
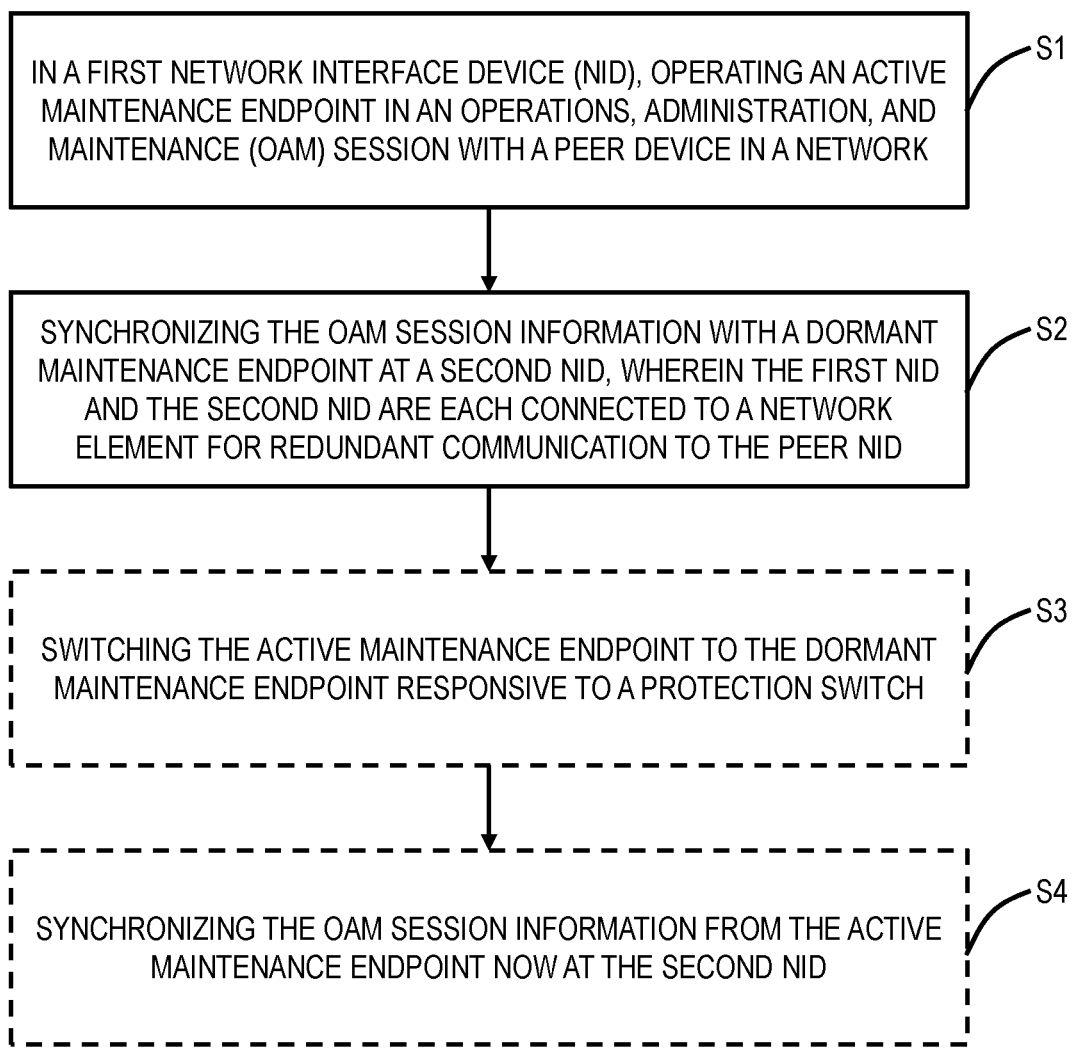
FIG. 22 is a flowchart of a process for retaining OAM session information between an active maintenance endpoint and a dormant maintenance endpoint.

FIG. 22 is a flowchart of a process 100 for retaining OAM session information between an active maintenance endpoint and a dormant maintenance endpoint. The process 100 includes, in a first Network Interface Device (NID), operating an active maintenance endpoint in an Operations, Administration, and Maintenance (OAM) session with a peer device in a network (step S1); and synchronizing the OAM session information with a dormant maintenance endpoint at a second NID, wherein the first NID and the second NID are each connected to a network element for redundant communication to the peer NID (step S2). The process 100 can further include switching the active maintenance endpoint to the dormant maintenance endpoint responsive to a protection switch (step S3); and synchronizing the OAM session information from the active maintenance endpoint now at the second NID (step S4).

The active maintenance endpoint can synchronize with the dormant maintenance endpoint by providing copies of OAM Protocol Data Units (PDUs). Alternatively, the active maintenance endpoint can synchronize with the dormant maintenance endpoint by providing relevant information from OAM Protocol Data Units (PDUs). The active maintenance endpoint can perform one or more of a generator function, a collector function, and a reflector function, each configured to provide data to the dormant maintenance endpoint. The active maintenance endpoint and the dormant maintenance endpoint can have the same configuration and the OAM session data such that peer NID is configured to operate the OAM session with either one based on protection. The OAM session data can relate to any of continuity checks, loopbacks, linktrace, delay measurements, and packet loss measurements.

In another embodiment, a logical Network Interface Device (NID) includes a first NID connected to a peer NID; a second NID connected to the peer NID and communicatively coupled to the first NID, wherein the first NID and the second NID are each connected to a network element for redundant communication to the peer NID, and wherein the first NID actively operates an active maintenance endpoint in an Operations, Administration, and Maintenance (OAM) session with the peer NID, and wherein the active maintenance endpoint synchronizes OAM session data with a dormant maintenance endpoint at the second NID. The dormant maintenance endpoint can become the active maintenance endpoint responsive to a protection switch, and wherein the dormant maintenance endpoint has the OAM session data in a database based on synchronization with the first NID.

In a further embodiment, a Network Interface Device (NID) includes a connection to a peer NID over a network; a client connection to a network element; a communications link to a second NID that provided redundancy to the network element and the peer NID; and circuitry configured to operate an active maintenance endpoint in an Operations, Administration, and Maintenance (OAM) session with the peer, and synchronize the OAM session information with a dormant maintenance endpoint at the second NID. The circuitry can be further configured to switch the active maintenance endpoint to the dormant maintenance endpoint responsive to a protection switch, and synchronize the OAM session information from the active maintenance endpoint now at the second NID.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A logical Network Interface Device (NID) comprising:
a first NID connected to a peer NID; and
a second NID connected to the peer NID and communicatively coupled to the first NID, wherein the first NID and the second NID are each connected to a network element for redundant communication to the peer NID,
wherein the first NID actively operates an active maintenance endpoint in an Operations, Administration, and Maintenance (OAM) session with the peer NID, and wherein the active maintenance endpoint synchronizes OAM session data with a dormant maintenance endpoint at the second NID, and wherein the first NID and the second NID each separately maintains an OAM session database of the OAM session data,
wherein the active maintenance endpoint and the dormant maintenance endpoint have the same configuration, are configured to invoke a session generator with the peer NID simultaneously, and are configured to maintain respective OAM session databases with the OAM session data such that the peer NID is configured to operate the OAM session transparently with either one based on protection such that the peer NID is unaware of which of the first NID and the second NID is the active maintenance endpoint.

2. The logical NID of claim 1, wherein the dormant maintenance endpoint becomes the active maintenance endpoint responsive to a protection switch, and wherein the dormant maintenance endpoint has the OAM session data in a database based on synchronization with the first NID.

3. The logical NID of claim 1, wherein the active maintenance endpoint synchronizes with the dormant maintenance endpoint by providing copies of OAM Protocol Data Units (PDUs).

4. The logical NID of claim 1, wherein the active maintenance endpoint synchronizes with the dormant maintenance endpoint by providing relevant information from OAM Protocol Data Units (PDUs).

5. The logical NID of claim 1, wherein the active maintenance endpoint performs one or more of a generator function, a collector function, and a reflector function, each configured to provide data to the dormant maintenance endpoint.

6. The logical NID of claim 1, wherein the OAM session data relates to any of continuity checks, loopbacks, linktrace, delay measurements, and packet loss measurements.

7. A Network Interface Device (NID) comprising:
a first port connected to a peer NID over a network;
a second port connected to a network element;
a communications interface connected to a second NID, wherein the second NID is also connected to the peer NID and the network element to provide redundancy; and
circuitry configured to
operate an active maintenance endpoint in an Operations, Administration, and Maintenance (OAM) session with the peer NID, and
synchronize OAM session data with a dormant maintenance endpoint at the second NID, via the communications interface, and wherein the NID and the second NID each separately maintains an OAM session database of the OAM session data, wherein the active maintenance endpoint and the dormant maintenance endpoint have the same configuration, are configured to invoke a session generator with the peer NID simultaneously, and are configured to maintain respective OAM session databases with the OAM session data such that the peer NID is configured to operate the OAM session transparently with either one based on protection such that the peer NID is unaware of which of the first NID and the second NID is the active maintenance endpoint.

8. The NID of claim 7, wherein the circuitry is further configured to
switch the active maintenance endpoint to the dormant maintenance endpoint responsive to a protection switch, and
synchronize the OAM session data from the active maintenance endpoint now at the second NID.

9. The NID of claim 7, wherein the active maintenance endpoint synchronizes with the dormant maintenance endpoint by providing copies of OAM Protocol Data Units (PDUs).

10. The NID of claim 7, wherein the active maintenance endpoint synchronizes with the dormant maintenance endpoint by providing relevant information from OAM Protocol Data Units (PDUs).

11. The NID of claim 7, wherein the active maintenance endpoint performs one or more of a generator function, a collector function, and a reflector function, each configured to provide data to the dormant maintenance endpoint.

12. The NID of claim 7, wherein the OAM session data relates to any of continuity checks, loopbacks, linktrace, delay measurements, and packet loss measurements.

13. A method comprising:
in a first Network Interface Device (NID), operating an active maintenance endpoint in an Operations, Administration, and Maintenance (OAM) session with a peer device in a network; and
synchronizing OAM session data with a dormant maintenance endpoint at a second NID, wherein the first NID and the second NID are each connected to a network element for redundant communication to the peer NID, and wherein the first NID and the second NID each separately maintains an OAM session database of the OAM session data,
wherein the active maintenance endpoint and the dormant maintenance endpoint have the same configuration, are configured to invoke a session generator with the peer NID simultaneously, and are configured to maintain respective OAM session databases with the OAM session data such that the peer NID is configured to operate the OAM session transparently with either one based on protection such that the peer NID is unaware of which of the first NID and the second NID is the active maintenance endpoint.

14. The method of claim 13, further comprising
switching the active maintenance endpoint to the dormant maintenance endpoint responsive to a protection switch; and
synchronizing the OAM session data from the active maintenance endpoint now at the second NID.

15. The method of claim 13, wherein the active maintenance endpoint synchronizes with the dormant maintenance endpoint by providing copies of OAM Protocol Data Units (PDUs).

16. The method of claim 13, wherein the active maintenance endpoint synchronizes with the dormant maintenance endpoint by providing relevant information from OAM Protocol Data Units (PDUs).

17. The method of claim 13, wherein the active maintenance endpoint performs one or more of a generator function, a collector function, and a reflector function, each configured to provide data to the dormant maintenance endpoint.

* * * * *